United States Patent
Hasegawa

(10) Patent No.: US 10,869,204 B2
(45) Date of Patent: Dec. 15, 2020

(54) TRANSMITTING APPARATUS EMPLOYING A SINGLE CARRIER BLOCK TRANSMISSION SYSTEM

(71) Applicant: Mitsubishi Electric Corporation, Chiyoda-ku (JP)

(72) Inventor: Fumihiro Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 404 days.

(21) Appl. No.: 15/564,116

(22) PCT Filed: Aug. 3, 2015

(86) PCT No.: PCT/JP2015/071980
§ 371 (c)(1),
(2) Date: Oct. 3, 2017

(87) PCT Pub. No.: WO2017/022056
PCT Pub. Date: Feb. 9, 2017

(65) Prior Publication Data
US 2018/0091983 A1    Mar. 29, 2018

(51) Int. Cl.
*H04W 16/28* (2009.01)
*H04J 11/00* (2006.01)
(Continued)

(52) U.S. Cl.
CPC .......... *H04W 16/28* (2013.01); *H04B 1/0475* (2013.01); *H04J 11/00* (2013.01); *H04L 27/2636* (2013.01); *H04J 2211/006* (2013.01)

(58) Field of Classification Search
CPC combination set(s) only.
See application file for complete search history.

(56) References Cited

U.S. PATENT DOCUMENTS

| 8,670,430 B2 | 3/2014 | Lee et al. |
| 2008/0002645 A1 | 1/2008 | Seki et al. |

(Continued)

FOREIGN PATENT DOCUMENTS

| EP | 2 725 717 A1 | 4/2014 |
| JP | 2008-011037 A | 1/2008 |

(Continued)

OTHER PUBLICATIONS

Combined Office Action and Search Report dated Sep. 5, 2018 in Chinese Patent Application No. 201580080819.6, 15 pages (with unedited computer generated English translation and English translation of categories of cited documents).

(Continued)

*Primary Examiner* — Christopher M Crutchfield
*Assistant Examiner* — Tito Q Pham
(74) *Attorney, Agent, or Firm* — Oblon, McClelland, Maier & Neustadt, L.L.P.

(57) ABSTRACT

A transmitting apparatus includes: a data generator that generates data symbols; a zero generator that generates zero symbols having signal values of zero; a controller that receives the data symbols and the zero symbols, and controls symbols to be output; a static sequence generator that generates static sequence symbols having signal values of a static sequence; a multiplexer that divides the static sequence symbols and generates a pre-interpolation block by arranging the divided static sequence symbols at a head of the pre-interpolation block and a tail of the pre-interpolation block in the pre-interpolation block, the head preceding the symbols input from the controller, the tail following the symbols input from the controller, and a signal converter that performs a Fourier transform, the interpolation, and an inverse Fourier transform on the pre-interpolation block and outputs a block having being subjected to the interpolation.

6 Claims, 18 Drawing Sheets

(51) Int. Cl.
*H04L 27/26* (2006.01)
*H04B 1/04* (2006.01)

(56) References Cited

U.S. PATENT DOCUMENTS

| | | |
|---|---|---|
| 2011/0274075 A1 | 11/2011 | Lee et al. |
| 2013/0279632 A1 | 10/2013 | Kim et al. |
| 2014/0016452 A1* | 1/2014 | Hasegawa ........... H04L 27/2636 370/210 |
| 2016/0006586 A1* | 1/2016 | Berardinelli ........ H04L 27/2607 375/295 |

FOREIGN PATENT DOCUMENTS

| | | |
|---|---|---|
| JP | 2012-516622 A | 7/2012 |
| WO | 2011/015119 A1 | 2/2011 |
| WO | 2012/176495 A1 | 12/2012 |
| WO | 2014/124661 A1 | 8/2014 |

OTHER PUBLICATIONS

Suzuki, K. et al. "A Study on Wireless Communication System with Interference Resilience" IEICE Technical Report WBS2014-53, 2014 pp. 77-81 (with unedited computer generated English translation).

Extended European Search Report dated Mar. 5, 2019 in European Patent Application No. 15900369.8.

Benvenuto, Nevio et al., "*Single Carrier Modulation With Nonlinear Frequency Domain Equalization: An Idea Whose Time Has Come—Again*", Proceeding of the IEEE, vol. 98, No. 1, Jan. 2010, pp. 69-96.

Bingham, John A. C., "*Multicarrier Modulation for Data Transmission: An Idea Whose Time Has Come*", IEEE Commun. Mag., vol. 28, No. 5, May 1990, pp. 5-8, 11-14.

Hasegawa, Fumihiro, et al., "*Static Sequence Embedded DFT-s-OFDM*", IEICE Technical Report, vol. 114, No. 490, RCS2014-326, Mar. 2015, pp. 147-152.

Porat, Boaz, "*A Course in Digital Signal Processing*", John Wiley and Sons Inc., 1997, pp. 106-107.

Jiang, Yong, et al. "*A New Out-Of-Band Power Suppression Scheme by Extending Effective Cyclic-Prefix of OFDM*", IEEE VTC2010-Spring, pp. 1-5.

Hasegawa, Fumihiro, et al. "*Novel Dynamic and Static Methods for Out-of-Band Power Suppression in SC-OFDM*", Wireless Communications Letters, IEEE, vol. 4, Issue 3, Jun. 2015, pp. 313-316.

International Search Report dated Oct. 20, 2015 in PCT/JP2015/071980, filed Aug. 3, 2015.

Office Action dated May 1, 2020 in corresponding Indian Patent Application No. 201747042646 (with English Translation), 9 pages.

* cited by examiner

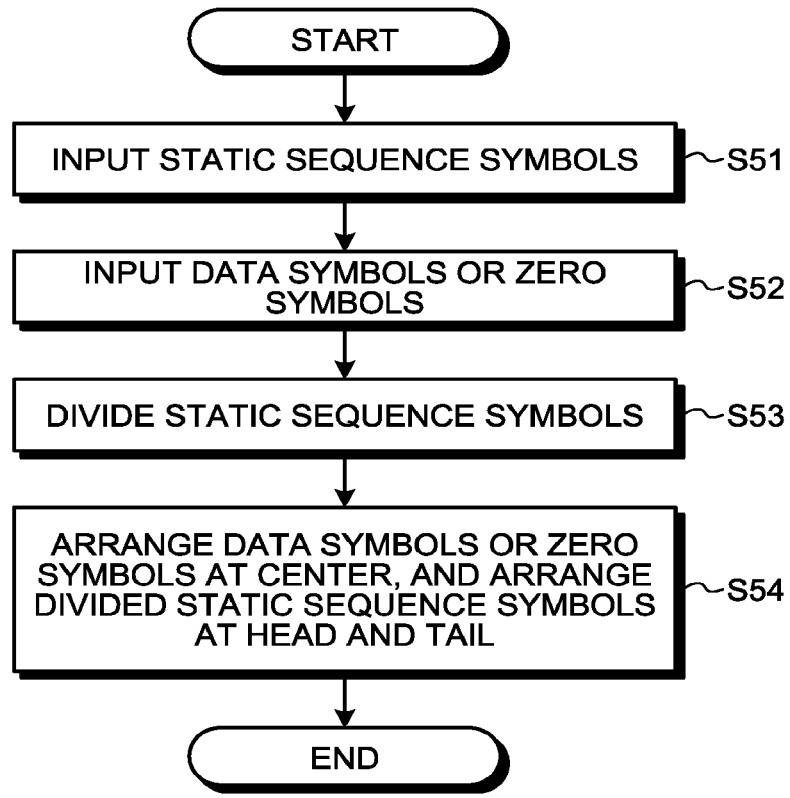
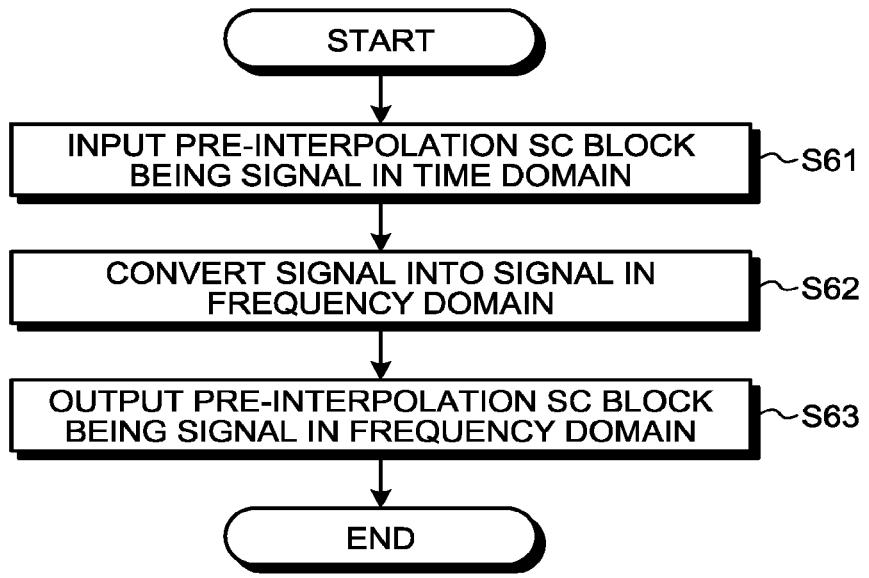

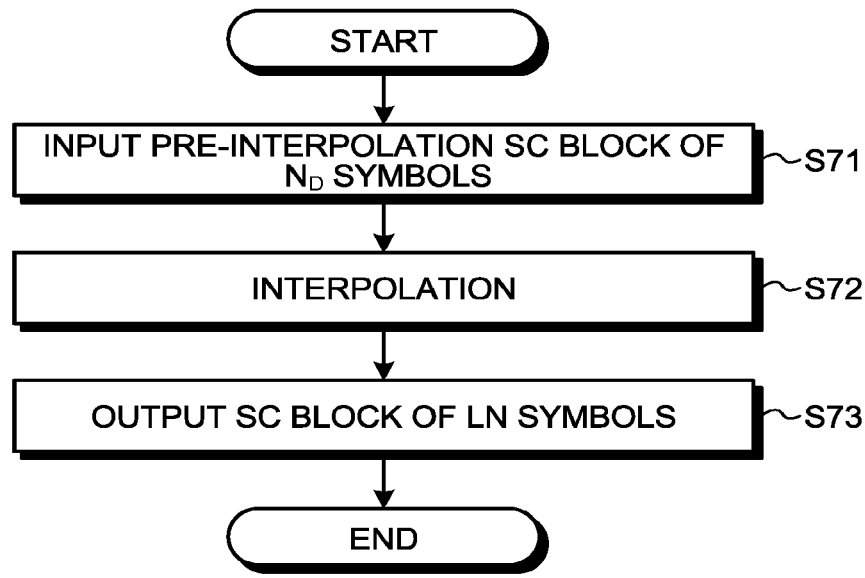
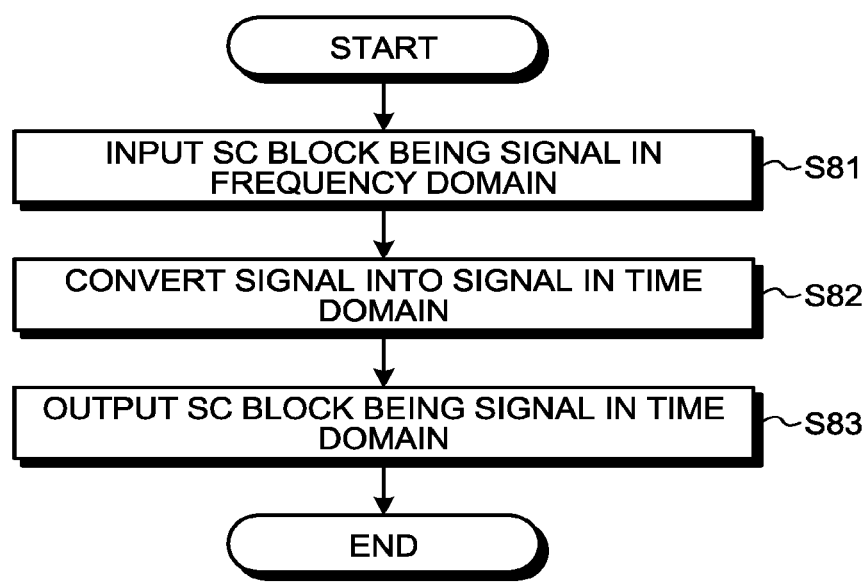

TRANSMITTING APPARATUS EMPLOYING A SINGLE CARRIER BLOCK TRANSMISSION SYSTEM

FIELD

The present invention relates to a transmitting apparatus employing a single carrier block transmission system.

BACKGROUND

A transmission path in a digital communication system experiences frequency selectivity and time shift as a result of multipath fading which occurs when a transmission signal is reflected off a building or the like, or a Doppler shift which occurs when a terminal moves. A received signal in such a multipath environment is a signal in which a transmission symbol interferes with a symbol arriving after the lapse of a delay time.

A single carrier (SC) block transmission system has attracted attention in recent years to obtain the best reception characteristic in the transmission path with such frequency selectivity (refer to Non Patent Literature 1, for example). The SC block transmission system can have lower peak power than an orthogonal frequency division multiplexing (OFDM) transmission system that is a multiple carrier (MC) block transmission (refer to Non Patent Literature 2, for example).

A transmitter performing SC block transmission performs the following transmission to take measures against the multipath fading, for example. A "modulator" first generates a digital modulation signal, i.e., a phase shift keying (PSK) signal or a quadrature amplitude modulation (QAM) signal, and then converts the digital modulation signal into a time domain signal by a precoder and an inverse discrete Fourier transform (IDFT) processor. After that, a cyclic prefix (CP) insertion unit inserts a CP as measures against multipath fading. The CP insertion unit copies a predetermined number of samples at the rear of the time domain signal and adds those to the beginning of a transmit signal. In order to suppress peak transmission power, the transmitter performing SC transmission generally performs a discrete Fourier transform (DFT) by the precoder.

Non Patent Literatures 1 and 2 suppress the peak transmission power while reducing the impact of the multipath fading. In the SC block transmission, however, the phase and amplitude between SC blocks are discontinuous and thus causes an out-of-band spectrum or out-of-band leakage. The out-of-band spectrum interferes with an adjacent channel. The out-of-band spectrum thus needs to be suppressed. A general communication system also defines a spectral mask, where the out-of-band spectrum needs to be suppressed so as to satisfy the spectral mask.

Non Patent Literature 3 suggests a technique of inserting symbols made up of static sequences at both ends of a block to suppress the out-of-band spectrum. A transmitter described in Non Patent Literature 3 generates data symbols and static sequence symbols for every block and multiplexes them in a time domain. The data symbols are symbols generated by, for example, a PSK or QAM modulation scheme, and are changed randomly. The transmitter converts a multiplexed signal into a signal in a frequency domain by DFT processing, performs interpolation such as oversampling in the frequency domain, and converts the signal into a signal in the time domain by IDFT processing. It is assumed that the number of inputs/outputs of a DFT unit is $N_D$, the number of inputs of an interpolation unit is $N_D$, the number of outputs thereof is LN, the number of inputs/outputs of an IDFT unit is LN, and an oversampling rate of oversampling being the example of the interpolation is L. The transmitter performs the IDFT processing at N points when L=1, which results in $N \geq N_D$. When $N-N_D>0$, the interpolation unit inserts a zero to the output of the DFT unit. The zero is inserted by a method described in, for example, Non Patent Literature 4.

The output of the IDFT unit is called a "sample". The static sequence symbols are made up of M symbols, where the same sequence is inserted at the same position in all blocks. Since the same sequence is generated in the generation of the static sequence symbols, static sequence symbols saved in a memory may be read therefrom. The oversampling may be performed by any processing but is generally performed by inserting a zero, for example.

As described above, the DFT unit receives input of $N_D$ symbols per one block in which the data symbols and the static sequence symbols are multiplexed. Since the number of the static sequence symbols is M, the number of the data symbols equals $N_D$-M. According to Non Patent Literature 3, the M the static sequence symbols are halved and arranged within the block such that M/2 symbols which are a rear half of the static sequence symbols are arranged at the head of the block preceding the $N_D$-M data symbols arranged at the center of the block, and that M/2 symbols which are a front half of the static sequence symbols are arranged at the tail of the block following the $N_D$-M data symbols. The static sequence symbols can be represented as $F_{-M/2}, F_{-M/2+1}, \ldots, F_{-1}, F_C, F_1, \ldots, F_{M/2-2}, F_{M/2-1}$, for example. When the transmitter generates a plurality of blocks, the M/2 symbols $F_0, F_1, \ldots, F_{M/2-2}, F_{M/2-1}$, which are the rear half of the static sequence symbols arranged at the head of the block are contiguous with the M/2 symbols $F_{-M/2}, F_{-M/2-1}, \ldots, F_{-1}$ which are the front half of the static sequence symbols arranged at the tail of a previous block. In a case where $d_{k,m}$ represents an "m"th data symbol in a "k"th block, for example, the arrangement of the data symbols and the static sequence symbols prior to being input to the DFT unit can be represented as $F_C, \ldots, F_{M/2-1}, d_{k,1}, \ldots d_{k,ND-M}$, $F_{-M/2}, \ldots, F_{-1}$ (where $N_D$ is denoted as ND in the subscript) in order from the head of the block. The static sequence symbols may use any sequence such as a Zadoff-Chu sequence or zeros.

Since the block in which the static sequence symbols described in Non Patent Literature 3 are arranged is input to the DFT unit, the output of the IDFT unit has continuous phases between blocks to thereby suppress the out-of-band spectrum. Although the static sequence symbols are arranged such that the front half and the rear half have the same numbers of symbols in the aforementioned example, the numbers of symbols may be different between the front half and the rear half.

A description is made below as to the principle of how the aforementioned insertion of the static sequence symbols maintains the waveform continuity. A phenomenon called the folding occurs in a block due to a combination of the DFT processing, the interpolation, and the IDFT processing. On the occurrence of the folding caused by the combination of the processing, the waveform of each symbol is folded back to the opposite side of the block at the end of the block. Such a characteristic is used to fix the symbol at the beginning and end of each block to thereby smoothly connect the phases between blocks.

CITATION LIST

Non Patent Literature

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98, no. 1, Jan 2010, pp. 69-96.

Non Patent Literature 2: J. A. C. Bingham, "Multicarrier Modulation for Data Transmission: An Idea Whose Time Has Come", IEEE Commun. Mag., vol. 28, no. 5, May 1990, pp. 5-14.

Non Patent Literature 3: F. Hasegawa et al., "Static Sequence Embedded DFT-s-OFDM", IEICE Technical Report, vol. 114 no. 490, RCS 2014-326, Mar 2015, pp. 147-152.

Non Patent Literature 4: B. Porat, "A Course in Digital Signal Processing", John Wiley and Sons Inc., 1997.

SUMMARY

Technical Problem

A transmitter emits a radio wave intensively toward a specific direction by beamforming, thereby reducing radio frequency interference with a receiver and sending the radio wave farther. In performing the analog beamforming, the transmitter requires a zero section in which a transmission signal becomes zero at the time of beam switching. The receiver can estimate a noise power or detect an interference wave when a part of a signal is the zero section upon receiving data. For a transmitting apparatus performing SC block transmission, however, a problem of phase discontinuity occurs between SC blocks when some SC blocks are set to zero. This results in an increase in an out-of-band spectrum.

The present invention has been made in view of the aforementioned circumstances, where an object of the invention is to provide a transmitting apparatus capable of setting a zero section in a signal that is to be transmitted while suppressing the increase in the out-of-band spectrum.

Solution to Problem

In order to solve the problem and achieve the object described above, the present invention provides a transmitting apparatus employing a single carrier block transmission system. The transmitting apparatus comprises a data generation unit to generate data symbols, and a zero generation unit to generate zero symbols having signal values of zero. The transmitting apparatus further comprises an output control section to receive input of the data symbols and the zero symbols, and control symbols to be output, and a static sequence generation unit to generate static sequence symbols having signal values of a static sequence. The transmitting apparatus further comprises a multiplexing unit to divide the static sequence symbols and generate a pre-interpolation block by arranging the divided static sequence symbols at a head of the pre-interpolation block and a tail of the pre-interpolation block in the pre-interpolation block, the head of the pre-interpolation block preceding the symbols input from the output control section, the tail of the pre-interpolation block following the symbols input from the output control section, the pre-interpolation block being a block prior to being subjected to interpolation. The transmitting apparatus further comprises a signal conversion section to perform a Fourier transform, the interpolation, and an inverse Fourier transform on the pre-interpolation block and output a block having being subjected to the interpolation.

Advantageous Effects of Invention

The transmitter according to the present invention provides an effect of setting the zero section in the signal that is to be transmitted while suppressing the increase in the out-of-band spectrum.

BRIEF DESCRIPTION OF DRAWINGS

FIG. 7 is a flowchart illustrating the operation of a multiplexing unit of the transmitting apparatus according to the first embodiment.

FIG. 8 is a flowchart illustrating the operation of a DFT unit of the transmitting apparatus according to the first embodiment.

FIG. 9 is a flowchart illustrating the operation of an interpolation unit of the transmitting apparatus according to the first embodiment.

FIG. 10 is a flowchart illustrating the operation of an IDFT unit of the transmitting apparatus according to the first embodiment.

DESCRIPTION OF EMBODIMENTS

A transmitting apparatus according to embodiments of the present invention will now be described in detail with reference to the drawings. Note that the present invention is not to be limited to the embodiments.

First Embodiment

Figure 1:
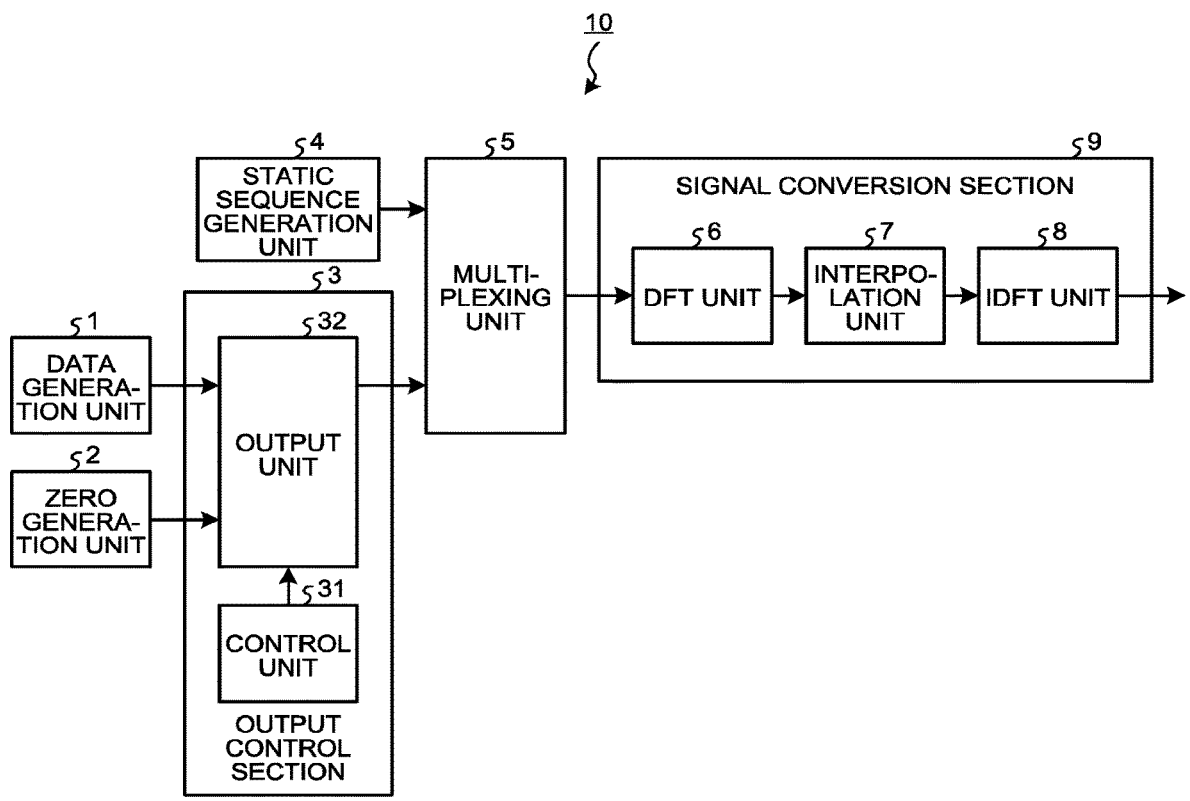
FIG. 1 is a block diagram illustrating an example of the configuration of a transmitter according to a first embodiment.

FIG. 1 is a block diagram illustrating an example of the configuration of a transmitting apparatus 10 according to a first embodiment of the present invention. The transmitting apparatus 10 includes a data generation unit 1, a zero generation unit 2, an output control section 3, a static sequence generation unit 4, a multiplexing unit 5, a DFT unit 6, an interpolation unit 7, and an IDFT unit 8. The DFT unit 6, the interpolation unit 7, and the IDFT unit 8 make up a signal conversion section 9. Note that FIG. 1 illustrates the configuration of the transmitting apparatus 10 necessary to describe the operation of the present invention, and omits illustration of the configuration necessary in a general transmitter.

Figure 2:
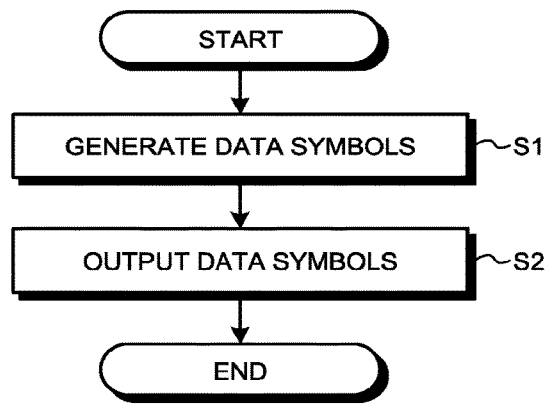
FIG. 2 is a flowchart illustrating the operation of a data generation unit of the transmitting apparatus according to the first embodiment.

The data generation unit 1 generates data symbols according to a modulation scheme such as PSK or QAM, and outputs the generated data symbols to the output control section 3. Note that the PSK and QAM are provided as examples of the modulation scheme, and a modulation scheme different from these schemes may be employed. FIG. 2 is a flowchart illustrating the operation of the data generation unit 1 of the transmitting apparatus 10 according to the first embodiment. The data generation unit 1 generates data symbols (step S1), and outputs the data symbols to the output control section 3 (step S2).

Figure 3:
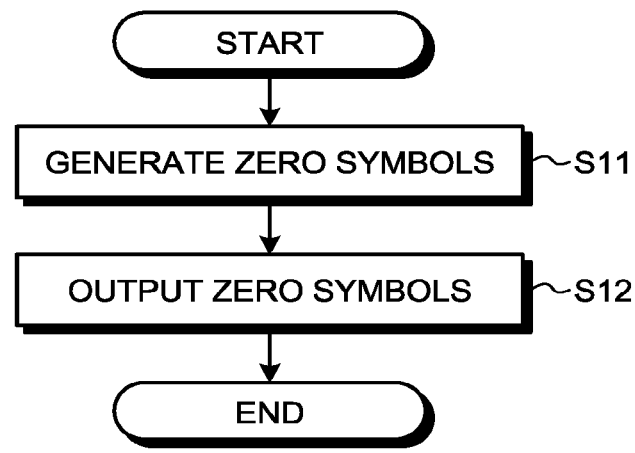
FIG. 3 is a flowchart illustrating the operation of a zero generation unit of the transmitting apparatus according to the first embodiment.

The zero generation unit 2 generates zero symbols having their signal values of zero, and outputs the generated zero symbols to the output control section 3. FIG. 3 is a flowchart illustrating the operation of the zero generation unit 2 of the transmitting apparatus 10 according to the first embodiment. The zero generation unit 2 generates zero symbols (step S11), and outputs the zero symbols to the output control section 3 (step S12).

Figure 4:
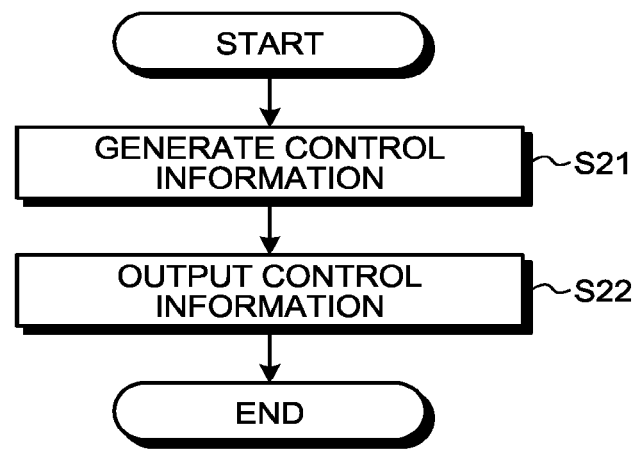
FIG. 4 is a flowchart illustrating the operation of a control unit in an output control section of the transmitting apparatus according to the first embodiment.
Figure 5:
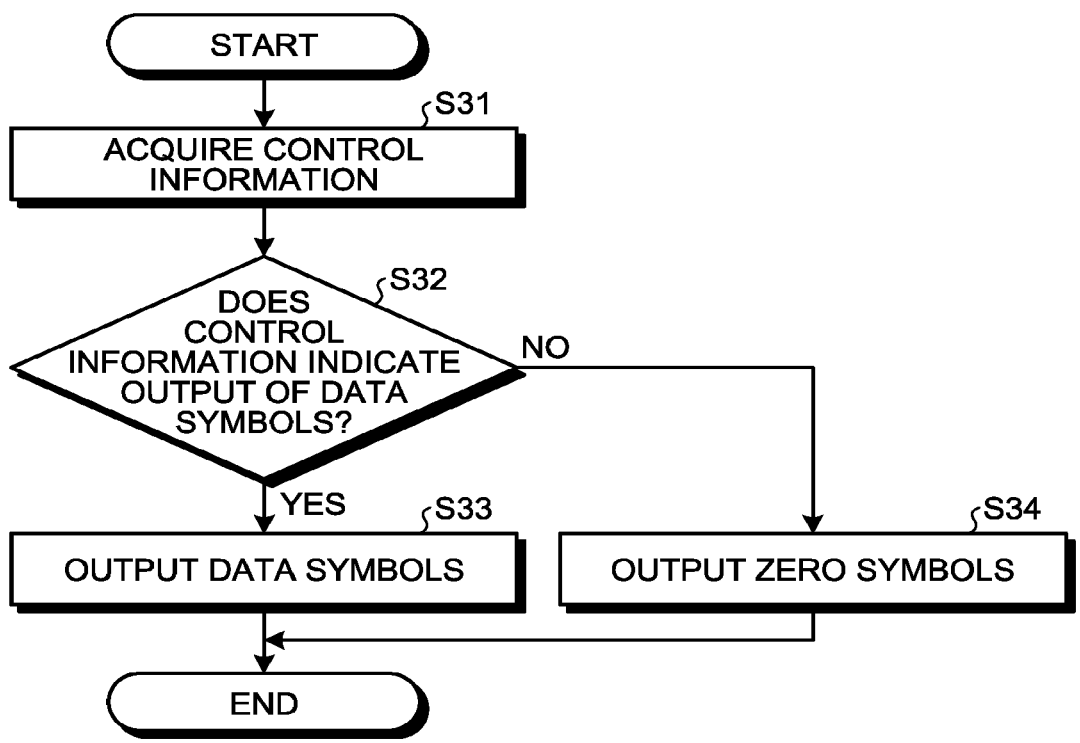
FIG. 5 is a flowchart illustrating the operation of an output unit in the output control section of the transmitting apparatus according to the first embodiment.

The output control section 3 performs control to output, to the multiplexing unit 5, the data symbols input from the data generation unit 1 or the zero symbols input from the zero generation unit 2. The output control section 3 controls the symbols to be output. The output control section 3 includes a control unit 31 and an output unit 32. The control unit 31 generates control information indicating that the data symbols or the zero symbols should be output to the multiplexing unit 5, and outputs the generated control information to the output unit 32. On the basis of the control information acquired from the control unit 31, the output unit 32 outputs, to the multiplexing unit 5, the data symbols input from the data generation unit 1 or the zero symbols input from the zero generation unit 2. Note that the control unit 31 may include information for controlling the operation of the data generation unit 1 and the zero generation unit 2 in the control information, and output this information to the data generation unit 1 and the zero generation unit 2. FIG. 4 is a flowchart illustrating the operation of the control unit 31 in the output control section 3 of the transmitting apparatus 10 according to the first embodiment. The control unit 31 generates the control information (step S21), and outputs the control information to the output unit 32 (step S22). FIG. 5 is a flowchart illustrating the operation of the output unit 32 in the output control section 3 of the transmitting apparatus 10 according to the first embodiment. The output unit 32 acquires the control information from the control unit 31 (step S31) and checks the content of the control information to output the data symbols input from the data generation unit 1 to the multiplexing unit 5 (step S33) when the control information indicates the output of the data symbols (Yes in step S32), or output the zero symbols input from the zero generation unit 2 to the multiplexing unit 5 (step S34) when the control information indicates the output of the zero symbols (No in step S32).

Figure 6:
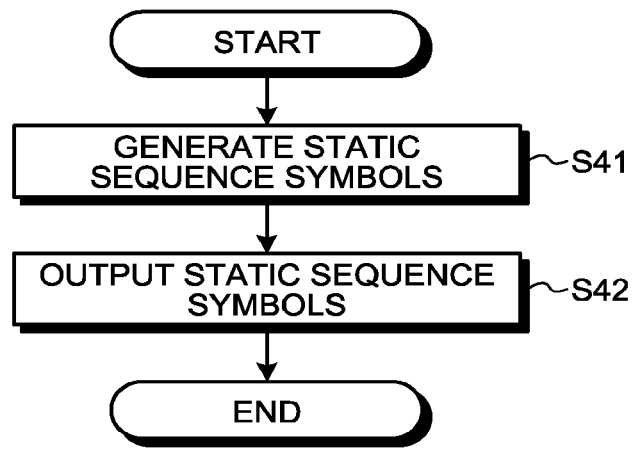
FIG. 6 is a flowchart illustrating the operation of a static sequence generation unit of the transmitting apparatus according to the first embodiment.

The static sequence generation unit 4 generates static sequence symbols that are to be inserted to a pre-interpolation SC block. The static sequence symbols have signal values made up of static sequences. The static sequence generation unit 4 outputs the generated static sequence symbols to the multiplexing unit 5. The static sequence symbols are similar to M pieces of symbols $F_{-M/2}, F_{-M/2+1}, \ldots, F_{-1}, F_0, F_1, \ldots, F_{M/2-2}, F_{M/2-1}$ described in the background section of this specification. The pre-interpolation SC block is a block generated by the multiplexing unit 5 (as discussed hereinafter) before the interpolation unit 7 performs interpolation on the block. The block prior to being interpolated is often called a pre-interpolation block. An SC block is a block interpolated by the interpolation unit 7 and output from the IDFT unit 8. FIG. 6 is a flowchart illustrating the operation of the static sequence generation unit 4 of the transmitting apparatus 10 according to the first embodiment. The static sequence generation unit 4 generates the static sequence symbols (step S41), and outputs the static sequence symbols to the multiplexing unit 5 (step S42).

The multiplexing unit 5 generates the pre-interpolation SC block by multiplexing the data symbols or the zero symbols input from the output control section 3 and the static sequence symbols input from the static sequence generation unit 4 in a time domain, and outputs the generated pre-interpolation SC block to the DFT unit 6. Here, it is assumed that the number of symbols in the pre-interpolation SC block is $N_D$, the number of the static sequence symbols is M, and the number of the data symbols or the zero symbols is $N_D$-M. The multiplexing unit 5 arranges the $N_D$-M data symbols or zero symbols at the center of the pre-interpolation SC block. The multiplexing unit 5 halves the M static sequence symbols and arranges the halved static sequence symbols within the pre-interpolation SC block such that M/2 symbols which are a rear half of the static sequence symbols are arranged at the head of the pre-interpolation SC block preceding the $N_D$-M data symbols or the zero symbols arranged at the center of the pre-interpolation SC block, and that M/2 symbols which are a front half of the static sequence symbols are arranged at the tail of the pre-interpolation SC block following the $N_D$-M data symbols or the zero symbols. The rear M/2 symbols of the static sequence symbols are the rear half of the static sequence symbols, and the front M/2 symbols of the static sequence symbols are the front half of the static sequence symbols. Note that the numbers of the static sequence symbols arranged at the head of the pre-interpolation SC block may be different from the number of the static sequence symbols arranged at the tail of the pre-interpolation SC block. The symbols may be arranged unevenly such that M' pieces of the static sequence symbols are arranged at the head and M'' pieces of the static sequence symbols are arranged at the tail, for example. Note that M=M'+M'' and M'≠M''. In order to simplify the description, it is assumed in the following discussions that the M/2 static sequence symbols are arranged at each of the head and the tail of the pre-interpolation SC block. FIG. 7 is a flowchart illustrating the operation of the multiplexing unit 5 of the transmitting apparatus 10 according to the first embodiment. The multiplexing unit 5 receives the input of the static sequence symbols from the static sequence generation unit 4 (step S51), and receives the input of the data symbols or the zero symbols from the output control section 3 (step S52). The multiplexing unit 5 divides the static sequence symbols (step S53), and arranges the data symbols or the zero symbols at the center of the pre-interpolation SC block and arranges the divided static sequence symbols such that the M/2 symbols which are the rear half of the static sequence symbols are arranged at the heat of the SC block and the M/2 symbols which are the front half of the static sequence symbols are arranged at the tail of the pre-interpolation SC block (step S54).

The DFT unit 6 is a Fourier transform unit that performs a Fourier transform on the pre-interpolation SC block of the $N_D$ symbols input from the multiplexing unit 5, such that the signal in the time domain is converted into a signal in a frequency domain. The DFT unit 6 outputs, to the interpolation unit 7, the pre-interpolation SC block that is the post-conversion signal in the frequency domain. FIG. 8 is a flowchart illustrating the operation of the DFT unit 6 of the transmitting apparatus 10 according to the first embodiment. The DFT unit 6 receives the input of the pre-interpolation SC block that is the signal in the time domain from the multiplexing unit 5 (step S61), performs the Fourier transform on the pre-interpolation SC block that is the signal in the time domain to convert the signal in the time domain into the signal in the frequency domain (step S62), and outputs the pre-interpolation SC block that is the signal in the frequency domain (step S63).

With an oversampling rate being set to "L", the interpolation unit 7 performs interpolation, for example, oversampling such as zero insertion in the frequency domain, on the pre-interpolation SC block which is the signal in the frequency domain, made up of $N_D$ symbols input from the DFT unit 6. The interpolating unit 7 thus generates and outputs an SC block that is a signal in the frequency domain and made up of LN symbols. For the zero insertion, the interpolation unit 7 inserts LN-$N_D$ zeros. FIG. 9 is a flowchart illustrating the operation of the interpolation unit 7 of the transmitting apparatus 10 according to the first embodiment. The interpolation unit 7 receives the input of the pre-interpolation SC block that is the signal in the frequency domain and made up of $N_D$ symbols (step S71), performs the interpolation on the pre-interpolation SC block that has been converted into the signal in the frequency domain (step S72), and generates and outputs the SC block that is the signal in the frequency domain and made up of LN symbols (step S73).

The IDFT unit 8 is an inverse Fourier transform unit that performs an inverse Fourier transform on the SC block which includes the LN symbols and is input from the interpolation unit 7, thereby converting the signal in the frequency domain into a signal in the time domain. The IDFT unit 8 outputs the interpolated SC block that is the post-conversion signal in the time domain and made up of LN samples. FIG. 10 is a flowchart illustrating the operation of the IDFT unit 8 of the transmitting apparatus 10 according to the first embodiment. The IDFT unit 8 receives the input of the SC block that is the signal in the frequency domain from the interpolation unit 7 (step S81), performs the inverse Fourier transform on the SC block that is the signal in the frequency domain, thereby converting the signal in the frequency domain into the signal in the time domain (step S82), and outputs the SC block that is the signal in the time domain (step S83).

Figure 11:
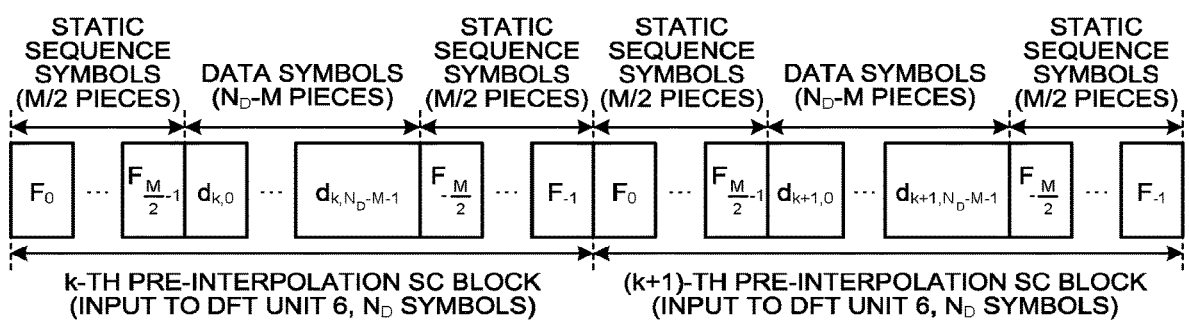
FIG. 11 is a diagram illustrating an example of the configuration of pre-interpolation SC blocks including data symbols, the pre-interpolation SC blocks being output from the multiplexing unit to the DFT unit of the transmitting apparatus according to the first embodiment.

The configuration of the pre-interpolation SC blocks output from the multiplexing unit 5 to the DFT unit 6 will now be described. FIG. 11 is a diagram illustrating an example of the configuration of pre-interpolation SC blocks including data symbols, the pre-interpolation SC blocks being output from the multiplexing unit 5 to the DFT unit 6 of the transmitting apparatus 10 according to the first embodiment. FIG. 11 illustrates, as an example, a kth pre-interpolation SC block and a (k+1)th pre-interpolation SC block that are output from the multiplexing unit 5 to the DFT unit 6. The data symbols generated by the data generation unit 1 and the static sequence symbols generated by the static sequence generation unit 4 are multiplexed by the multiplexing unit 5 to thereby provide each of the kth pre-interpolation SC block and the (k+1)th pre-interpolation SC block. Note that $d_{k,m}$ denotes an "m"th data symbol in the kth pre-interpolation SC block. The kth pre-interpolation SC block includes $N_D$ symbols that are $F_0, \ldots F_{M/2-1}$, $d_{k,0}, \ldots d_{k,ND-M-1}, F_{-M/2}, \ldots, F_{-1}$ (where $N_D$ is denoted as ND in the subscript) in order from the head of the pre-interpolation SC block. Likewise, the (k+1)th pre-interpolation SC block includes $N_D$ symbols that are $F_0, \ldots F_{M/2-1}$, $d_{k+1,0}, \ldots d_{k+1,ND-M-1}, F_{-M/2}, \ldots, F_{-1}$ (where $N_D$ is denoted as ND in the subscript) in order from the head of the pre-interpolation SC block. In FIG. 11, the left side of the pre-interpolation SC block corresponds to the head side of the pre-interpolation SC block, and the right side of the pre-interpolation SC block corresponds to the tail side of the pre-interpolation SC block. The same applies to the figures illustrating each block in the following description. As illustrated in FIG. 11, in each pre-interpolation SC block, M/2 symbols that are the rear half of the static sequence symbols are arranged at the head of the pre-interpolation SC block preceding $N_D$-M data symbols arranged at the center of the pre-interpolation SC block, and M/2 symbols that are the front half of the static sequence symbols are arranged at the tail of the pre-interpolation SC block following the $N_D$-M data symbols. As a result, M/2 symbols $F_0, F_1, \ldots, F_{M/2-2}, F_{M/2-2}$ that are the rear half of the static sequence symbols and arranged at the head of the (k+1)th pre-interpolation SC block are contiguous with M/2 symbols $F_{-M/2}, F_{-M/2+1}, \ldots, F_{-1}$ that are the front half of the static sequence symbols and arranged at the tail of the preceding kth pre-interpolation SC block. This allows phases to be continuous between the SC blocks, which have been subjected to the DFT processing by the DFT unit 6, the interpolation by the interpolation unit 7, and the IDFT processing by the IDFT unit 8, thereby suppressing an out-of-band spectrum.

Figure 12:
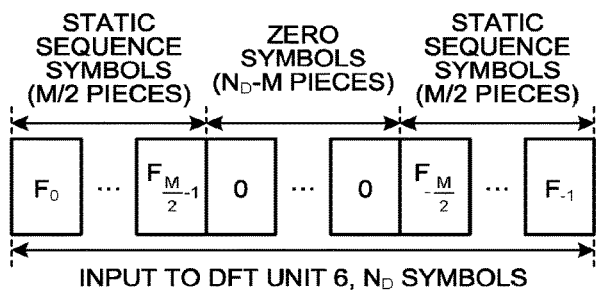
FIG. 12 is a diagram illustrating an example of the configuration of a pre-interpolation SC block including zero symbols, the pre-interpolation SC block being output from the multiplexing unit to the DFT unit of the transmitting apparatus according to the first embodiment.

FIG. 12 is a diagram illustrating an example of the configuration of the pre-interpolation SC block including the zero symbols, the pre-interpolation SC block being output from the multiplexing unit 5 to the DFT unit 6 of the transmitting apparatus 10 according to the first embodiment. This pre-interpolation SC block is the pre-interpolation SC block of FIG. 11 with the data symbols of the pre-interpolation SC block of FIG. 11 being replaced with the zero symbols. Even when the pre-interpolation SC block including the zero symbols is adjacent to the pre-interpolation SC block including the data symbols, the static sequence symbols are arranged in the same manner in the respective pre-interpolation SC blocks. Thus, as is the case with FIG. 11, the phases are connected between the SC block, which has been subjected to the DFT processing by the DFT unit 6, the interpolation by the interpolation unit 7, and the IDFT processing by the IDFT unit 8, and another SC block such as the SC block including the data symbols, thereby removing the phase discontinuity between the SC blocks. Apart from the suppressing the increase in the out-of-band spectrum, thus, the transmitting apparatus 10 can thus set a zero section within the SC block that is to be transmitted.

The transmitting apparatus 10 is configured such that when the data generation unit 1 generates the data symbols for a plurality of pre-interpolation SC blocks and the output control section 3 inputs these data symbols into the multiplexing unit 5, the pre-interpolation SC blocks output from the multiplexing unit 5 have the configuration illustrated in FIG. 11. On the other hand, the transmitting apparatus 10 is configured such that when the zero generation unit 2 generates the zero symbols for only one pre-interpolation SC block and the output control section 3 inputs these zero symbols into the multiplexing unit 5, the pre-interpolation SC block output from the multiplexing unit 5 has the configuration illustrated in FIG. 12.

Figure 13:
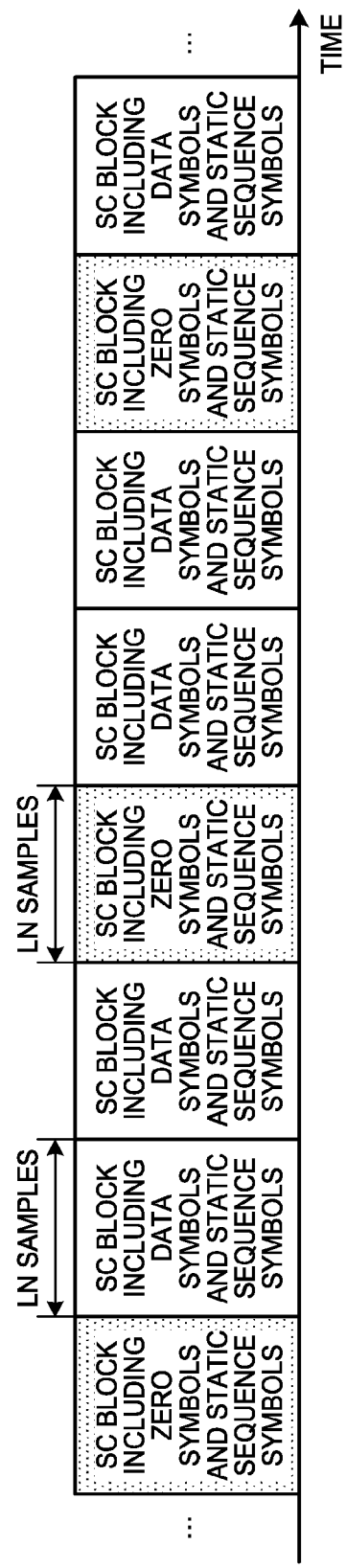
FIG. 13 is a diagram illustrating in time sequence SC blocks that are output from the IDFT unit of the transmitting apparatus according to the first embodiment.

FIG. 13 is a diagram illustrating in time sequence the SC blocks that are output from the IDFT unit 8 of the transmitting apparatus 10 according to the first embodiment. In order to simplify the illustration in FIG. 13, the data symbol is denoted as "data", the static sequence symbol is denoted as "static sequence", and the zero symbol is denoted as "zero". As illustrated in FIG. 13, the transmitting apparatus 10 transmits on a regular basis the SC block made up of LN samples including the zero symbols and the static sequence symbols in the course of transmitting the SC block made up of LN samples including the data symbols and the static sequence symbols. The frequency of transmitting the SC block including the zero symbols and the static sequence symbols with respect to the SC block including the data symbols and the static sequence symbols is based on the content of the control information that is output from the control unit 31 of the output control section 3. In transmitting the SC block including the data symbols and the static sequence symbols twice and then transmitting the SC block including the zero symbols and the static sequence symbols once, as illustrated in FIG. 13, for example, the control unit 31 generates and outputs, to the output unit 32, the control information indicating that the zero symbols for the one pre-interpolation SC block should be output from the zero generation unit 2 after the outputs of the data symbols for the two pre-interpolation SC blocks from the data generation unit 1. The output control section 3 outputs the zero symbols for the one pre-interpolation SC block from the zero generation unit 2 on a regular basis.

Note that although the transmitting apparatus 10 transmits the SC block including the zero symbols on a regular basis in the aforementioned description, the transmitting apparatus may also transmit the SC block differently. The transmitting apparatus 10 may transmit the SC block signal including the zero symbols on an irregular basis. In this case, the control unit 31 in the output control section 3 of the transmitting apparatus 10 generates and outputs, to the output unit 32, the control information indicating that the zero symbols generated by the zero generation unit 2 should be output to the multiplexing unit 5 on an irregular basis.

Figure 14:
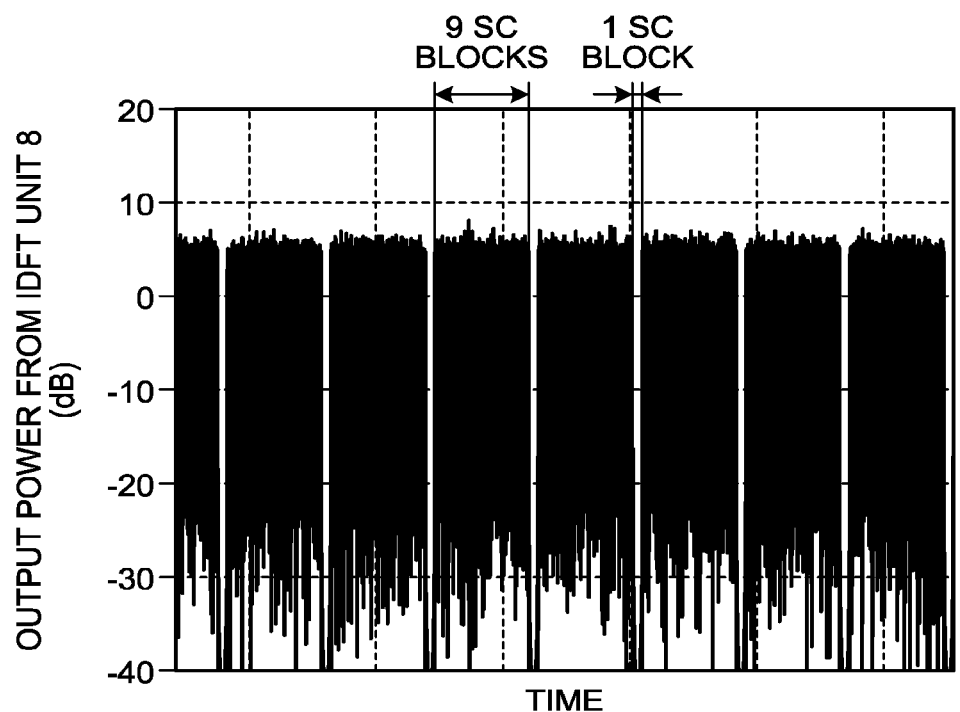
FIG. 14 is a chart illustrating an example of output power of the SC blocks output from the transmitting apparatus according to the first embodiment.

FIG. 14 is a chart illustrating an example of output power of the SC blocks output from the transmitting apparatus 10 according to the first embodiment. A horizontal axis represents time, and a vertical axis represents the output power from the IDFT unit 8 of the transmitting apparatus 10. FIG. 14 illustrates an example in which QPSK is employed as a modulation scheme of the data symbols with $N_D$=1200, N=2048, M=84, and L=4. FIG. 14 further illustrates the example in which the transmitting apparatus 10 transmits a zero section, namely the SC block including the zero symbols, every 10 SC blocks on a regular basis. One can see in FIG. 14 that the output power drops in a section that occurs on a regular basis, or every 10 SC blocks.

Figure 15:
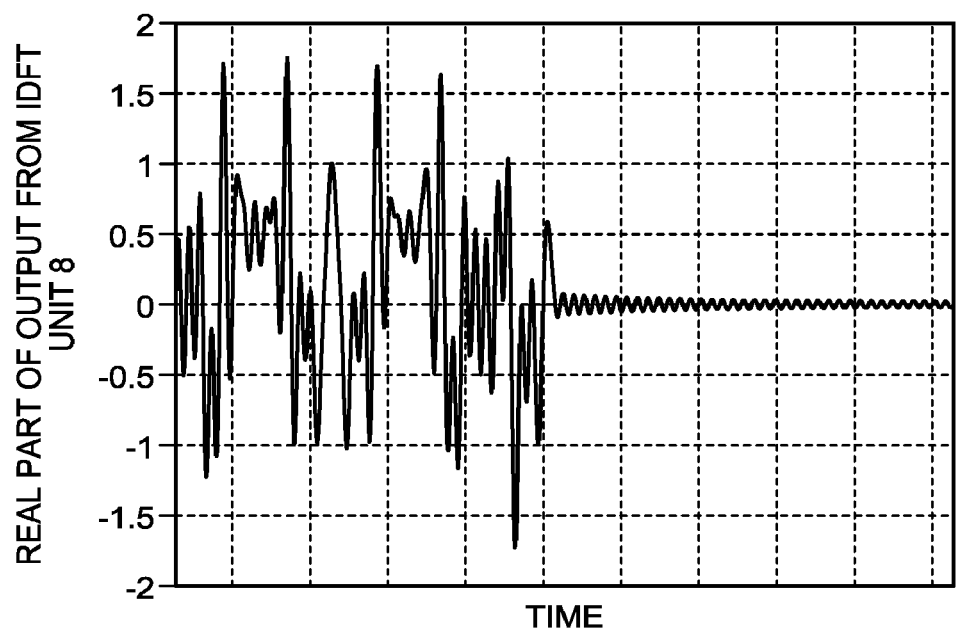
FIG. 15 is a chart illustrating a signal waveform near the boundary between an SC block including zero symbols and an SC block including data symbols among the SC blocks output from the transmitting apparatus according to the first embodiment.

FIG. 15 is a chart illustrating a signal waveform near the boundary between the SC block including the zero symbols and the SC block including the data symbols among the SC blocks output from the transmitting apparatus 10 according to the first embodiment. A horizontal axis represents time, and a vertical axis represents a real part of the output from the IDFT unit 8 of the transmitting apparatus 10. In FIG. 15, the left side corresponds to the SC block including the data symbols, and the right side corresponds to the SC block including the zero symbols. Note that the time range represented on the horizontal axis is shorter than the time range illustrated in FIG. 14. The signal waveform illustrated in FIG. 15 represents the real part of the output from the IDFT unit 8. Since the static sequence symbols are inserted at the head and the tail of each SC block at the stage of generating the pre-interpolation SC block as described above, one can see in FIG. 15 that the signal waveform is connected smoothly between the adjacent SC blocks.

Figure 16:
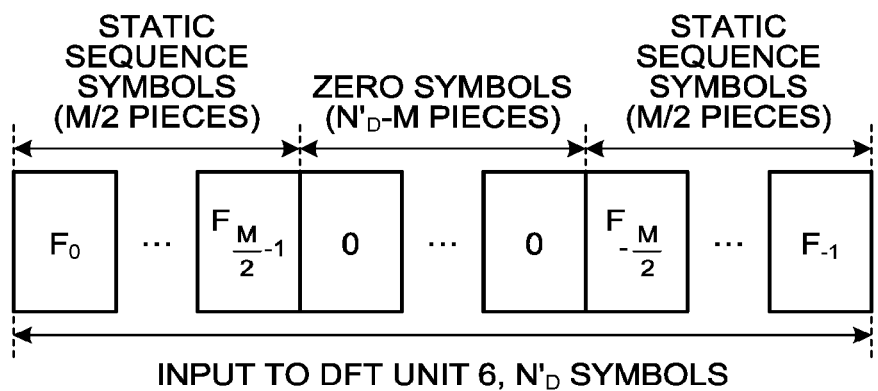
FIG. 16 is a diagram illustrating an example of the configuration of a pre-interpolation SC block including zero symbols, the pre-interpolation SC block being output from the multiplexing unit to the DFT unit of the transmitting apparatus according to the first embodiment.

Note that although the length, namely, the number of symbols, of the pre-interpolation SC block including the zero symbols in FIG. 12 is set to $N_D$ which is identical to the number of symbols of the pre-interpolation SC block including the data symbols, the pre-interpolation SC block including the zero symbols may also have a different length. For example, the pre-interpolation SC block including the zero symbols may be longer than the pre-interpolation SC block including the data symbols, namely, may have more than $N_D$ symbols, or may be shorter than the pre-interpolation SC block including the data symbols, namely, may have less than $N_D$ symbols. Even when the pre-interpolation SC block including the zero symbols is set to have the length different from the length of the pre-interpolation SC block including the data symbols, it is desired to keep the length of the static sequence symbols to a constant, namely, keep the number of the static sequence symbols to M, in order to suppress the out-of-band spectrum. FIG. 16 is a diagram illustrating an example of the configuration of the pre-interpolation SC block including the zero symbols, the pre-interpolation SC block being output from the multiplexing unit 5 to the DFT unit 6 of the transmitting apparatus 10 according to the first embodiment. FIG. 16 differs from FIG. 12 in that the number of symbols of the pre-interpolation SC block including the zero symbols is set to $N'_D$. The number of symbols $N'_D$ may be set to a value less than $N_D$ ($N'_D<N_D$) or more than $N_D$ ($N'_D>N_D$). The number of symbols $N'_D$ may be set such that the transmitting apparatus 10 can accommodate the time required for an interference measurement or beam switching in performing analog beamforming.

Figure 17:
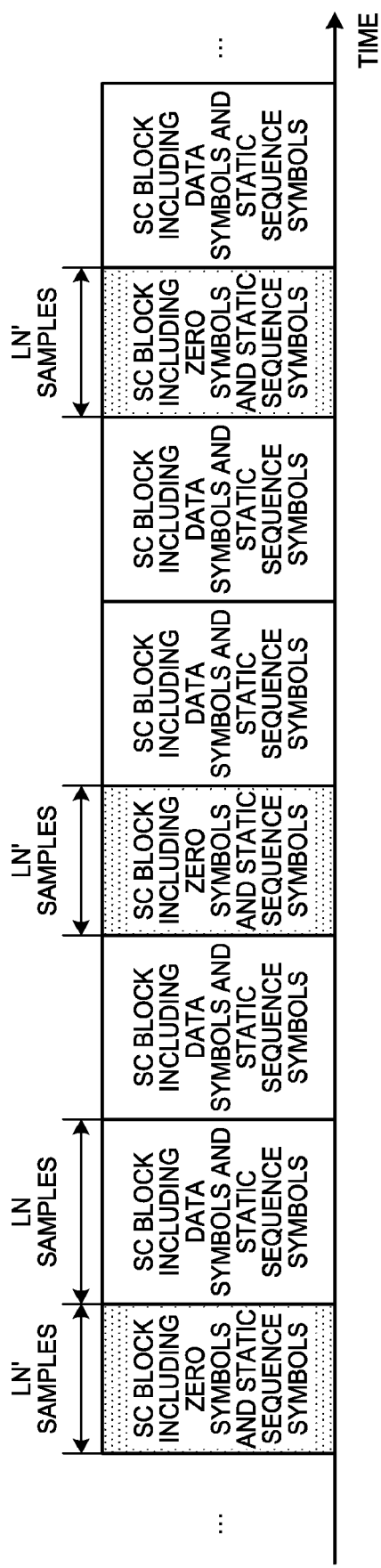
FIG. 17 is a diagram illustrating in time sequence SC blocks that are output from the IDFT unit of the transmitting apparatus according to the first embodiment.

FIG. 17 is a diagram illustrating in time sequence SC blocks that are output from the IDFT unit 8 of the transmitting apparatus 10 according to the first embodiment. FIG. 17 illustrates a case where the transmitting apparatus 10 transmits on a regular basis an SC block made up of LN' samples including the zero symbols and the static sequence symbols in the course of transmitting an SC block made up of LN samples including the data symbols and the static sequence symbols. The figure in this case illustrates that the SC block including the zero symbols and the static sequence symbols is shorter than the SC block including the data symbols and the static sequence symbols. Note that the frequency of transmitting the SC block including the zero symbols and the static sequence symbols with respect to the SC block including the data symbols and the static sequence symbols is controlled as controlled by the output control section 3 in FIG. 13.

The transmitting apparatus 10 may also perform normalization in order to adjust power in every SC block after inserting the zero symbols thereto. The transmitting apparatus 10 may perform normalization in the multiplexing unit 5, for example, or in the output control section 3.

Figure 18:
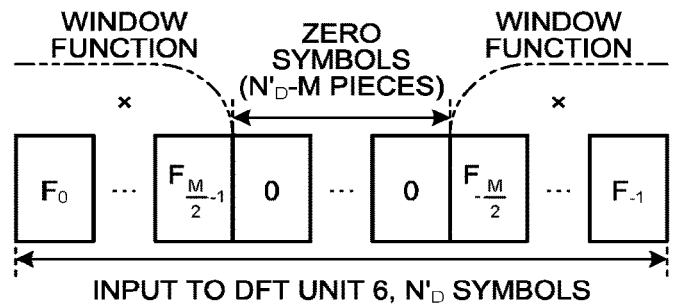
FIG. 18 is a diagram illustrating an image of processing in which a static sequence symbol of an SC block is multiplied by a window function in the transmitting apparatus according to the first embodiment.

The transmitting apparatus 10 may further multiply the static sequence symbol by a window function such that a signal of the SC block including the zero symbols is converged to zero quickly in the time domain. FIG. 18 is a diagram illustrating an image of processing in which the static sequence symbol in the SC block is multiplied by the window function in the transmitting apparatus 10 according to the first embodiment. With $h_1$ being a window coefficient, the transmitting apparatus 10 performs the following specific operation on each of the static sequence symbols. Note that a symbol with the sign "'" on the left side of the equations indicates a static sequence symbol that has being subjected to window function processing.

$$F'_{-M/2}=F_{-M/2}\times h_0, \ F'_{-M/2+1}=F_{-M/2+1}\times h_1, \ldots,$$
$$F'_{-1}=F_{-1}\times h_{M/2-1}, \ F'_C=F_0\times h_{M/2}, \ \ldots,$$
$$F'_{M/2-1}=F_{M/2-1}\times h_{M-1}$$

The transmitting apparatus 10 performs the aforementioned window function processing in the static sequence generation unit 4.

Since the transmitting apparatus 10 inserts the zero symbols and the static sequence symbols in the pre-interpolation SC block as described above before the block is input to the DFT unit 6, the transmitting apparatus 10 can set the zero section within the SC block that is to be output. The transmitting apparatus 10 can freely adjust the length of the zero section, or the number of the zero symbols. The transmitting apparatus can also insert the zero symbols, the data symbols, the and static sequence symbols in the SC block before the block is input to the DFT unit 6, as described later in a second embodiment.

Figure 19:
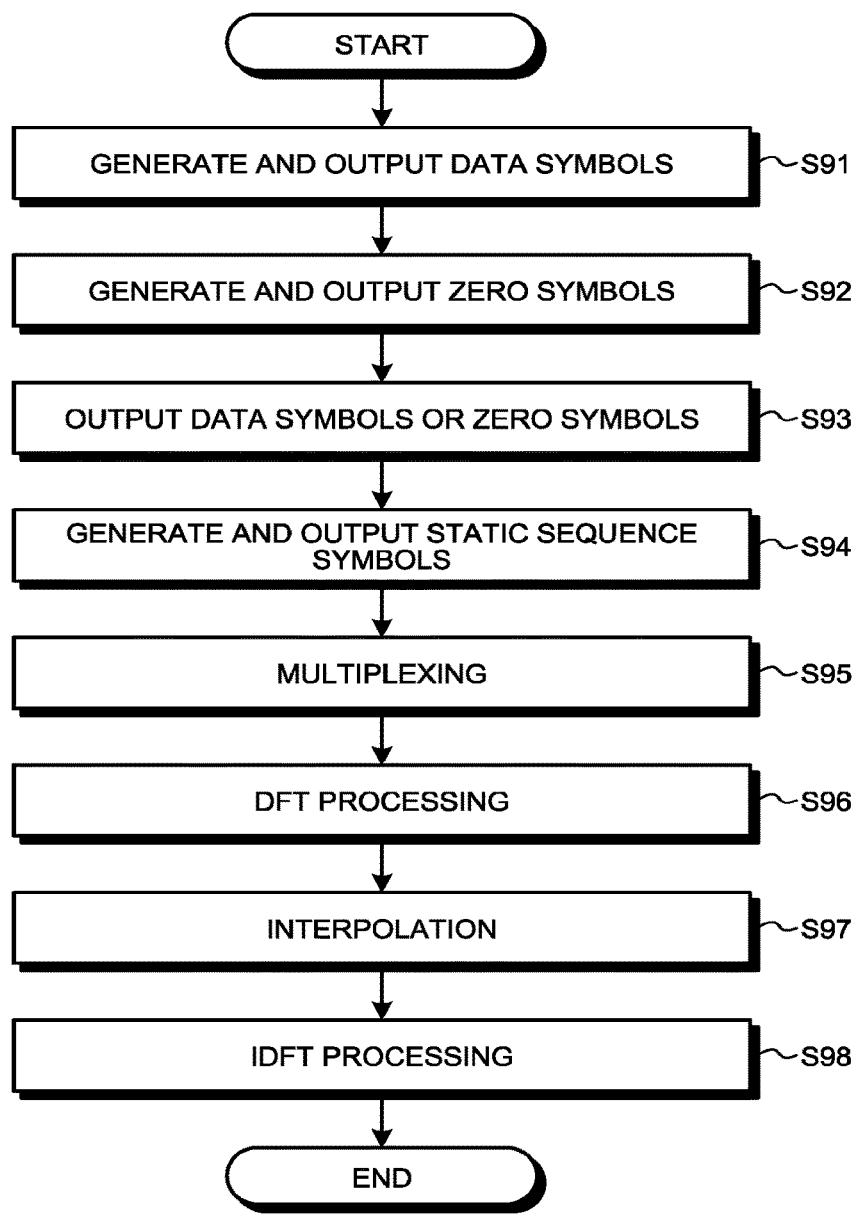
FIG. 19 is a flowchart illustrating the operation of the transmitting apparatus of the first embodiment for generating and outputting an SC block.

Basic processing performed by the transmitting apparatus 10 will be described in a flowchart. FIG. 19 is a flowchart illustrating the operation of the transmitting apparatus 10 of the first embodiment for generating and outputting the SC block. In the transmitting apparatus 10, first, the data generation unit 1 generates and outputs the data symbols (step S91), and the zero generation unit 2 generates and outputs the zero symbols (step S92). The output control section 3 outputs, to the multiplexing unit 5, the data symbols input from the data generation unit 1 or the zero symbols input from the zero generation unit 2 (step S93). The static sequence generation unit 4 generates and outputs the static sequence symbols (step S94). The multiplexing unit 5 multiplexes the data symbols or the zero symbols input from the output control section 3 and the static sequence symbols input from the static sequence generation unit 4 (step S95). In transmitting apparatus 10, then, the DFT unit 6 performs the DFT processing in which the pre-interpolation SC block generated by the multiplexing is converted into the signal in the frequency domain (step S96), the interpolation unit 7 performs the interpolation on the signal in the frequency domain (step S97), and the IDFT unit 8 performs the IDFT processing in which the signal having been subjected to the interpolation is converted into the signal in the time domain (step S98). Note that a detailed operation of each configuration is performed on the basis of a flowchart of each configuration.

The pre-interpolation SC block including the zero symbols illustrated in FIG. 12 is made up of the zero symbols and the static sequence symbols. The pre-interpolation SC block itself is thus a fixed signal. In this case, a signal obtained by performing the DFT processing, the oversampling, and the IDFT processing on the pre-interpolation SC block including the zero symbols may be saved in a storage unit for use.

Figure 20:
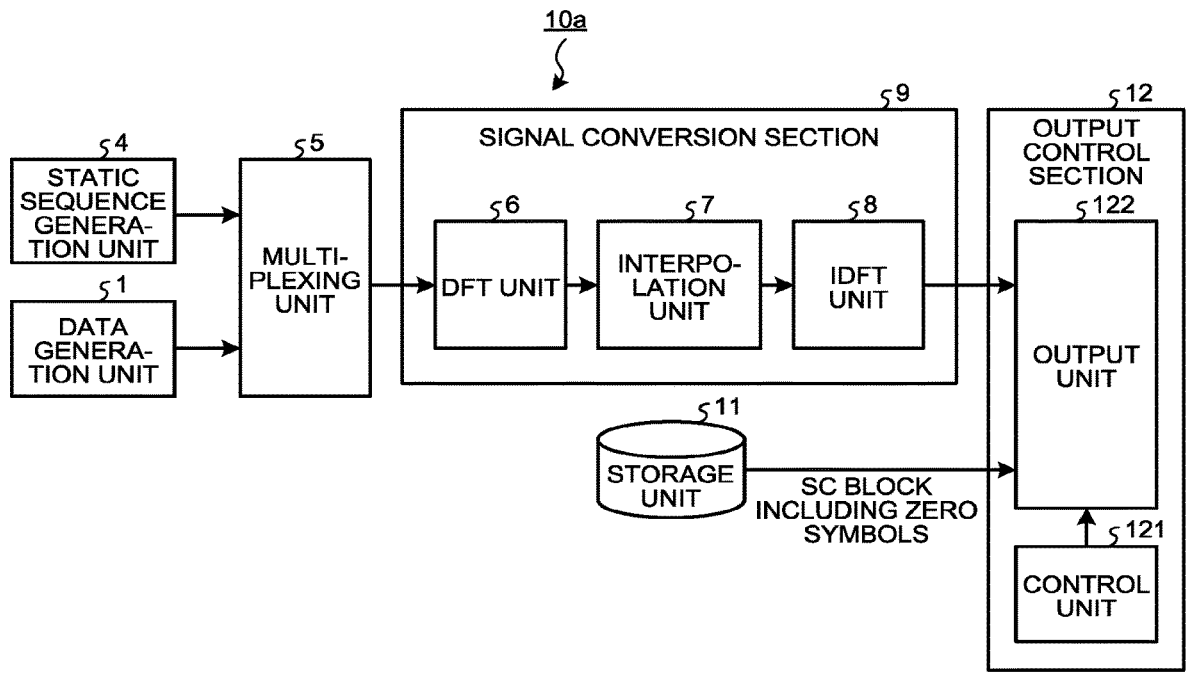
FIG. 20 is a block diagram illustrating an example of the configuration of a transmitting apparatus according to the first embodiment.

FIG. 20 is a block diagram illustrating an example of the configuration of a transmitting apparatus 10a according to the first embodiment. The transmitting apparatus 10a includes the data generation unit 1, the static sequence generation unit 4, the multiplexing unit 5, the DFT unit 6, the interpolation unit 7, the IDFT unit 8, a storage unit 11, and an output control section 12. The DFT unit 6, the interpolation unit 7, and the IDFT unit 8 make up the signal conversion section 9.

The storage unit 11 stores a signal of an SC block made up of LN samples, which is the same as the signal of the SC block made up of the LN samples provided through the following processes discussed in relation to the transmitting apparatus 10 illustrated in FIG. 1: the output control section 3 outputs the zero symbols; the multiplexing unit 5 multiplexes the zero symbols and the static sequence symbols to generate the pre-interpolation SC block made up of $N_D$ symbols; the DFT unit 6, the interpolation unit 7, and the IDFT unit 8 perform the DFT processing, the interpolation and IDFT processing, respectively, on the generated pre-interpolation SC block.

Figure 21:
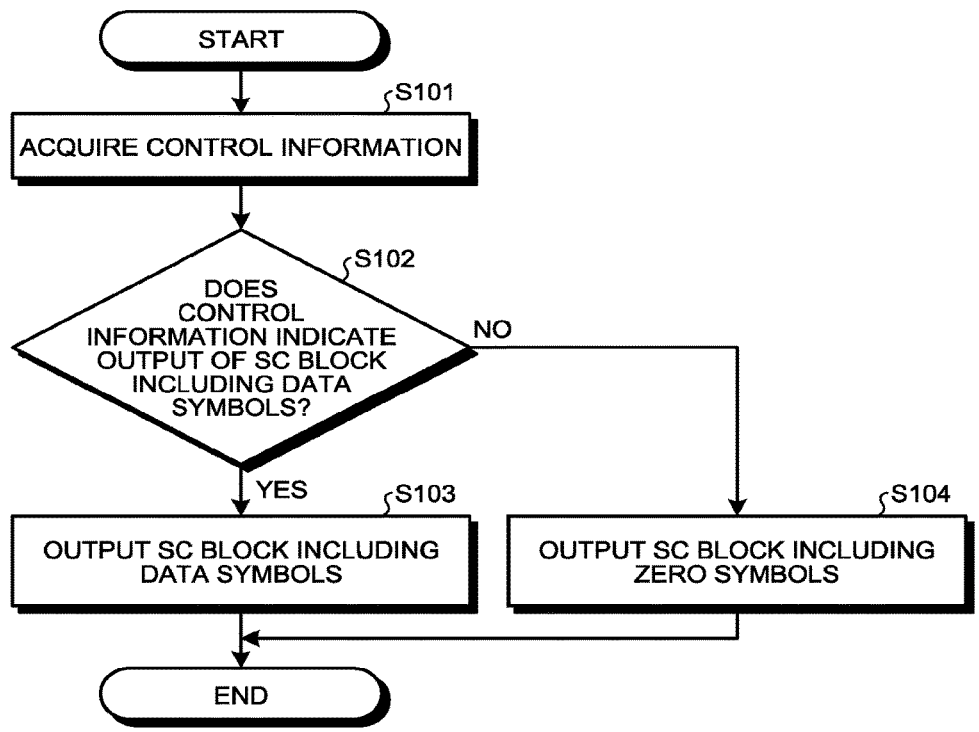
FIG. 21 is a flowchart illustrating the operation of an output unit in an output control section of the transmitting apparatus according to the first embodiment.

The output control section 12 performs control to output the SC block including the data symbols that is input from the IDFT unit 8 or the SC block including the zero symbols that is stored in the storage unit 11. The output control section 12 controls a block that is to be output. The output control section 12 includes a control unit 121 and an output unit 122. The control unit 121 generates control information indicating that the SC block including the data symbols or the SC block including the zero symbols should be output, and outputs the generated control information to the output unit 122. On the basis of the control information acquired from the control unit 121, the output unit 122 outputs the SC block including the data symbols that is input from the IDFT unit 8 or the SC block including the zero symbols that is stored in the storage unit 11. Note that to output the SC block including the zero symbols stored in the storage unit 11, the output unit 122 of the output control section 12 reads the SC block including the zero symbols from the storage unit 11 and output this SC block. The output control section 12 outputs on a regular basis the SC block including the zero symbols stored in the storage unit 11. A flowchart of the operation of the control unit 121 is similar to the flowchart of the control unit 31 of the transmitter 10 illustrated in FIG. 4 although the content of the control information generated by the control unit 121 is different from that generated by the control unit 31. FIG. 21 is a flowchart illustrating the operation of the output unit 122 in the output control section 12 of the transmitting apparatus 10*a* according to the first embodiment. The output unit 122 acquires the control information from the control unit 121 (step S101) and checks the content of the control information. The output unit 122 outputs the SC block including the data symbols that is input from the IDFT unit 8 (step S103) when the control information indicates that the SC block including the data symbols should be output (Yes in step S102). The output unit 122 outputs the SC block including the zero symbols that is stored in the storage unit 11 (step S104) when the control information indicates that the SC block including the zero symbols should be output (No in step S102).

Note that the multiplexing unit 5 in the transmitting apparatus 10*a* performs the same operation as the operation of the multiplexing unit 5 in the transmitting apparatus 10 when the data symbols are input from the output control section 3 into the multiplexing unit 5 of the transmitting apparatus 10.

Figure 22:
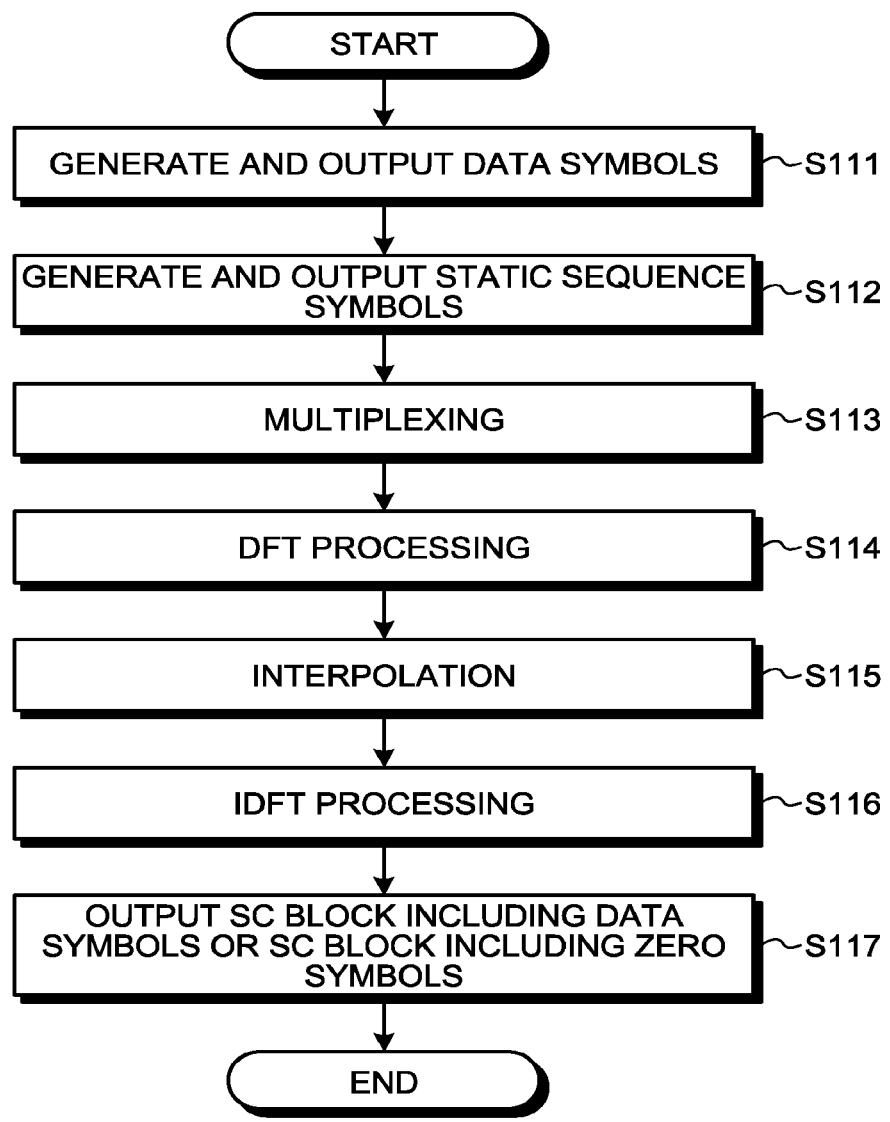
FIG. 22 is a flowchart illustrating the operation of the transmitting apparatus of the first embodiment for generating and outputting an SC block.

Basic processing performed by the transmitting apparatus 10*a* will be described in a flowchart. FIG. 22 is a flowchart illustrating the operation of the transmitting apparatus 10*a* of the first embodiment for generating and outputting the SC block. In the transmitting apparatus 10*a*, first, the data generation unit 1 generates and outputs the data symbols (step S111), and the static sequence generation unit 4 generates and outputs the static sequence symbols (step S112). The multiplexing unit 5 multiplexes the data symbols input from the data generation unit 1 and the static sequence symbols input from the static sequence generation unit 4 (step S113). In the transmitting apparatus 10*a*, then, the DFT unit 6 performs the DFT processing in which the pre-interpolation SC block generated by the multiplexing is converted into the signal in the frequency domain (step S114), the interpolation unit 7 performs the interpolation (step S115), and the IDFT unit 8 performs the IDFT processing in which the signal is converted into the signal in the time domain (step S116). The output control section 12 then outputs the SC block including the data symbols that is input from the IDFT unit 8 or the SC block including the zero symbols that is stored in the storage unit 11 (step S117). Note that a detailed operation of each configuration is performed on the basis of a flowchart of each configuration.

The transmitting apparatus 10*a* configured as illustrated in FIG. 20 can provide an effect similar to that of the transmitting apparatus 10 illustrated in FIG. 1.

The hardware configuration of the transmitting apparatus 10 and the transmitting apparatus 10*a* will now be described. In the transmitting apparatus 10 or the transmitting apparatus 10*a*, the data generation unit 1 is implemented by a modulator, the DFT unit 6 is implemented by a DFT circuit, the interpolation unit 7 is implemented by an interpolation circuit, the IDFT unit 8 is implemented by an IDFT circuit, and the storage unit 11 is implemented by a memory. Thus, the following descriptions are made as to the parts of the configuration of the transmitting apparatus 10 or 10*a* corresponding to the zero generation unit 2, the static sequence generation unit 4, the multiplexing unit 5, and the output control section 3 or 12.

Figure 23:
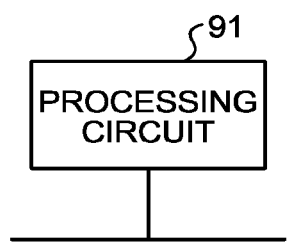
FIG. 23 is a diagram illustrating an example of the hardware configuration of the transmitting apparatus according to the first embodiment.
Figure 24:
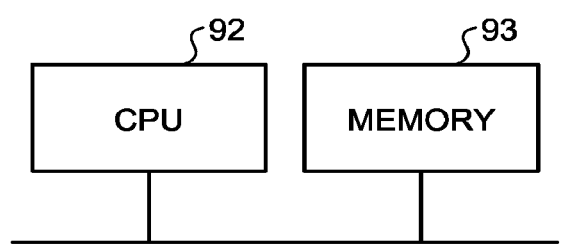
FIG. 24 is a diagram illustrating an example of the hardware configuration of the transmitting apparatus according to the first embodiment.

FIGS. 23 and 24 are diagrams each illustrating an example of the hardware configuration of the transmitting apparatus 10 or 10*a* according to the first embodiment. In the transmitting apparatus 10 or 10*a*, the functions of the zero generation unit 2, the static sequence generation unit 4, the multiplexing unit 5, and the output control section 3 or 12 are implemented by a processing circuit 91. That is, the transmitting apparatus 10 or 10*a* includes a processor that generates the zero symbols, generates the static sequence symbols, multiplexes a plurality of kinds of the symbols, and outputs one of two kinds of the symbols or one of the two SC blocks. The processing circuit 91 may be dedicated hardware, or a memory 93 and a central processing unit (CPU) 92 executing a program stored in the memory 93. The CPU 92 may be a central processor, a processing unit, an arithmetic unit, a microprocessor, a microcomputer, a processor, or a digital signal processor (DSP).

When the processing circuit 91 is the dedicated hardware, the processing circuit 91 is, for example, a single circuit, a complex circuit, a programmed processor, a parallel-programmed processor, an application specific integrated circuit (ASIC), a field programmable gate array (FPGA), or a combination of thereof. The functions of the zero generation unit 2, the static sequence generation unit 4, the multiplexing unit 5, and the output control section 3 or 12 may be individually or collectively implemented by the processing circuit 91.

When the processing circuit 91 is the CPU 92 and the memory 93, the functions of the zero generation unit 2, the static sequence generation unit 4, the multiplexing unit 5, and the output control section 3 or 12 are implemented by software, firmware, or a combination of software and firmware. The software or firmware is described as a program and stored in the memory 93. In the processing circuit 91, the CPU 92 reads and executes the program stored in the memory 93 to thereby implement the functions of the aforementioned units. That is, the transmitting apparatus 10 or 10*a* includes the memory 93 storing programs which, when executed by the processing circuit 91, performs a step of generating the zero symbols, a step of generating the static sequence symbols, a step of multiplexing the two kinds of symbols, and a step of outputting one of the two symbols or a step of outputting one of the two SC blocks. In other words, these programs cause a computer to execute the procedure and method performed by the zero generation unit 2, the static sequence generation unit 4, the multiplexing unit 5, and the output control section 3 or 12. The memory 93 can be a non-volatile or volatile semiconductor memory such as a random access memory (RAM), a read only memory (ROM), a flash memory, an erasable programmable ROM (EPROM), or an electrically EPROM (EEPROM), as well as a magnetic disk, a flexible disk, an optical disk, a compact disc, a mini disc, or a digital versatile disc (DVD).

Note that the respective functions of the zero generation unit 2, the static sequence generation unit 4, the multiplexing unit 5, and the output control section 3 or 12 may be implemented partly by dedicated hardware and partly by software or firmware. For example, the functions of the zero generation unit 2 and the static sequence generation unit 4 can be implemented by the processing circuit 91 as the dedicated hardware, and the functions of the multiplexing unit 5 and the output control section 3 or 12 can be implemented by the processing circuit 91 where the CPU 92 reads and executes the program stored in the memory 93.

The processing circuit 91 can thus implement the aforementioned functions by hardware, software, firmware, or a combination thereof. Note that the zero generation unit 2 and the static sequence generation unit 4 are not limited to the aforementioned configurations but may be implemented by a modulator, as with the data generation unit 1.

As has been described, in generating the SC block including the data symbols and the SC block including the zero symbols, the transmitting apparatus 10 of the present embodiment inserts the static sequence symbols at the same positions in the pre-interpolation SC block including the data symbols and the pre-interpolation SC block including the zero symbols before the pre-interpolation SC blocks are subjected to the DFT processing, the interpolation, and the IDFT processing. This removes the phase discontinuity between the SC blocks even in the case of setting the zero section in the signal that is to be transmitted, and can thus suppress the increase in the out-of-band spectrum.

Second Embodiment

In the first embodiment discussed above, the one SC block includes the zero symbols and the static sequence symbols, or the data symbols and the static sequence symbols. In the present embodiment described below, one SC block includes zero symbols, data symbols, and static sequence symbols.

Figure 25:
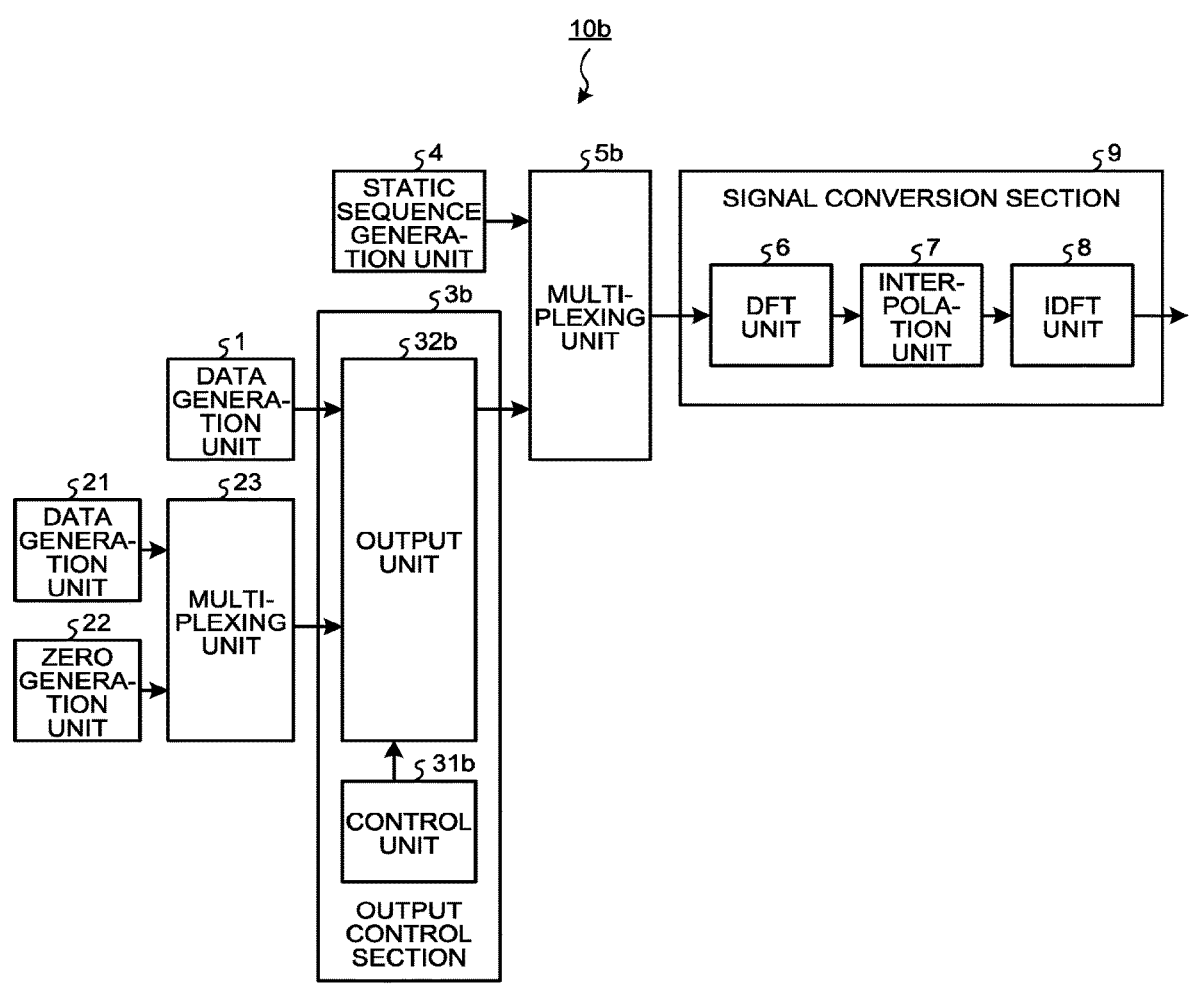
FIG. 25 is a block diagram illustrating an example of the configuration of a transmitting apparatus according to a second embodiment.

FIG. 25 is a block diagram illustrating an example of the configuration of a transmitting apparatus 10b according to a second embodiment of the present invention. The transmitting apparatus 10b is the same as the transmitting apparatus 10 illustrated in FIG. 1 except that the zero generation unit 2, the output control section 3, and the multiplexing unit 5 are removed and a data generation unit 21, a zero generation unit 22, a multiplexing unit 23, an output control section 3b, and a multiplexing unit 5b are added. The DFT unit 6, the interpolation unit 7, and the IDFT unit 8 make up the signal conversion section 9. In the transmitting apparatus 10b of the second embodiment, the data generation unit 21 is defined as a first data generation unit, and data symbols generated by the data generation unit 21 are defined as first data symbols. The data generation unit 1 is defined as a second data generation unit, and data symbols generated by the data generation unit 1 are defined as second data symbols. Moreover, the multiplexing unit 23 is defined as a first multiplexing unit, and the multiplexing unit 5b is defined as a second multiplexing unit.

The data generation unit 21 generates the data symbols according to the modulation scheme such as the PSK or QAM, and outputs the generated data symbols to the multiplexing unit 23. Note that the PSK and QAM are provided as the examples of the modulation scheme, a modulation scheme different from these schemes may be employed. The same modulation scheme is employed by the data generation units 1 and 21. The data generation unit 1 generates the $N_D$-M data symbols for one pre-interpolation SC block. The data generation unit 21 generates X data symbols for one pre-interpolation SC block. Although the data generation unit 21 generates different numbers of symbols from those generated by the data generation unit 1, a flowchart of the operation of the data generation unit 21 is similar to the flowchart of the data generation unit 1 illustrated in FIG. 2.

The zero generation unit 22 generates zero symbols having their signal values of zero, and outputs the generated zero symbols to the multiplexing unit 23. The zero generation unit 2 of the first embodiment generates the $N_D$-M zero symbols for one pre-interpolation SC block. The zero generation unit 22 generates $N_D$-M-X zero symbols for one pre-interpolation SC block. Although the zero generation unit 22 generates different numbers of symbols from those generated by the zero generation unit 2, a flowchart of the operation of the zero generation unit 22 is similar to the flowchart of the zero generation unit 2 illustrated in FIG. 3.

Figure 26:
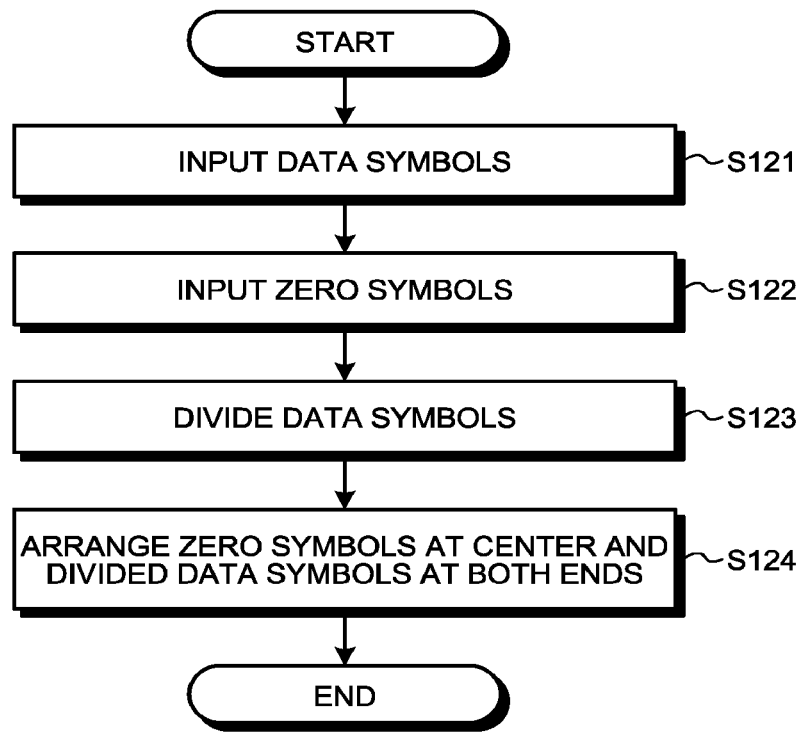
FIG. 26 is a flowchart illustrating the operation of a multiplexing unit of the transmitting apparatus according to the second embodiment.

The multiplexing unit 23 generates multiplexed symbols by multiplexing the data symbols input from the data generation unit 21 and the zero symbols input from the zero generation unit 22 in a time domain, and outputs the generated multiplexed symbols to the output control section 3b. The multiplexed symbols are symbols including the data symbols and the zero symbols. Specifically, the multiplexing unit 23 multiplexes the X data symbols and the $N_D$-M-X zero symbols to generate $N_D$-M multiplexed symbols. The multiplexing unit 23 generates the multiplexed symbols by, for example, dividing the X data symbols into X/2 data symbols, and arranging the X/2 data symbols adjacent to each of both ends of the $N_D$-M-X zero symbols. FIG. 26 is a flowchart illustrating the operation of the multiplexing unit 23 of the transmitting apparatus 10b according to the second embodiment. The multiplexing unit 23 receives the input of the data symbols from the data generation unit 21 (step S121), and receives the input of the zero symbols from the zero generation unit 22 (step S122). The multiplexing unit 23 divides the data symbols (step S123), arranges the zero symbols at the center, and arranges the divided data symbols at both ends of the zero symbols (step S124). Note that such an arrangement of the data symbols and zero symbols is an exemplary one and is not limited to this one. For example, the multiplexing unit 23 may generate the multiplexed symbols by dividing the $N_D$-M-X zero symbols into ($N_D$-M-X)/2 zero symbols, arranging the ($N_D$-M-X)/2 zero symbols adjacent to each of both ends of the X data symbols. The following description is based on the assumption that the data symbols are divided.

Figure 27:
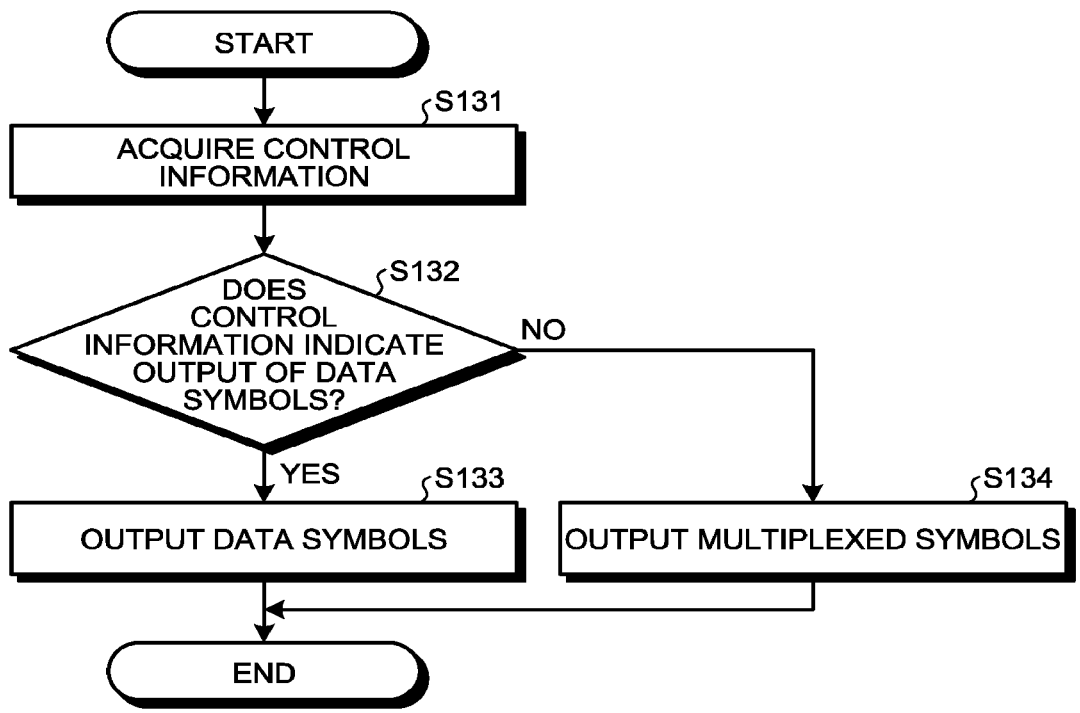
FIG. 27 is a flowchart illustrating the operation of an output unit in an output control section of the transmitting apparatus according to the second embodiment.

The output control section 3b performs control to output, to the multiplexing unit 5b, the data symbols input from the data generation unit 1 or the multiplexed symbols input from the multiplexing unit 23. The output control section 3b controls symbols to be output. The output control section 3b includes a control unit 31b and an output unit 32b. The control unit 31b generates control information indicating that the data symbols or the multiplexed symbols should be output to the multiplexing unit 5b, and outputs the generated control information to the output unit 32b. On the basis of the control information acquired from the control unit 31b, the output unit 32b outputs, to the multiplexing unit 5b, the data symbols input from the data generation unit 1 or the multiplexed symbols input from the multiplexing unit 23. The output control section 3b outputs the multiplexed symbols for one pre-interpolation SC block on a regular basis from the multiplexing unit 23. Note that the control unit 31b may include a piece of information for controlling the operation of the data generation units 1 and 21 and the zero generation unit 22 in the control information, and output this information to the data generation units 1 and 21 and the zero generation unit 22. Although the control unit 31b generates the different content of the control information from that generated by the control unit 31, a flowchart of the operation of the control unit 31b is similar to the flowchart of the control unit 31 illustrated in FIG. 4. FIG. 27 is a flowchart illustrating the operation of the output unit 32b in the output control section 3b of the transmitting apparatus 10b according to the second embodiment. The output unit 32b acquires the control information from the control unit 31b (step S131) and checks the content of the control information. The output unit 32b outputs the data symbols input from the data generation unit 1 to the multiplexing unit 5b (step S133) when the control information indicates that the data symbols should be output (Yes in step S132), or outputs the multiplexed symbols input from the multiplexing unit 23 to the multiplexing unit 5b (step S134) when the control information indicates that the multiplexed symbols should be output (No in step S132).

Figure 28:
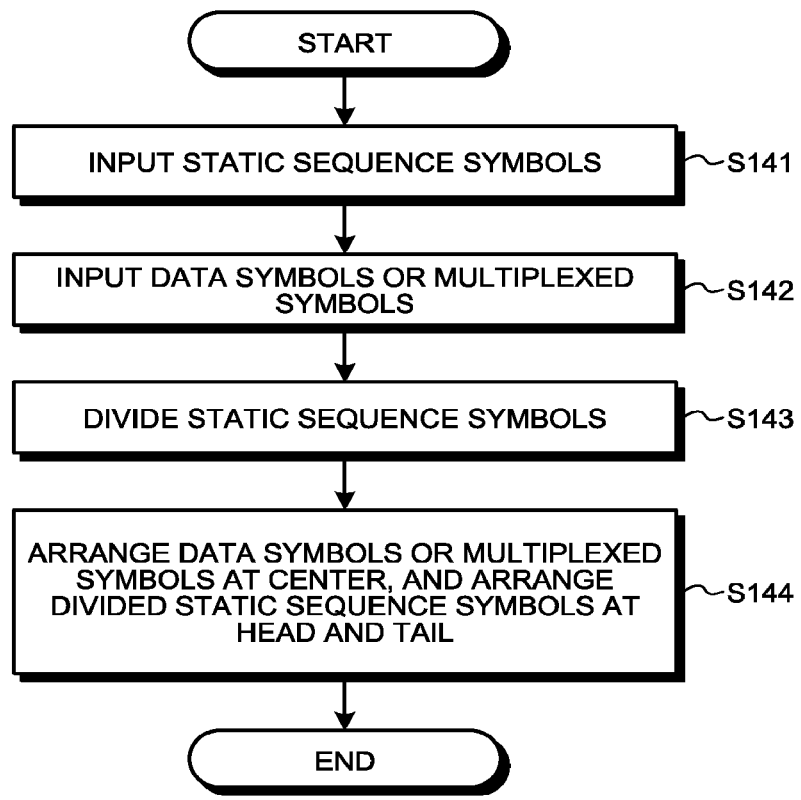
FIG. 28 is a flowchart illustrating the operation of a multiplexing unit of the transmitting apparatus according to the second embodiment.

The multiplexing unit 5b generates a pre-interpolation SC block by multiplexing the data symbols or the multiplexed symbols input from the output control section 3b and the static sequence symbols input from a static sequence generation unit 4 in the time domain, and outputs the generated pre-interpolation SC block to the DFT unit 6. As with the first embodiment, it is assumed that the number of symbols in the pre-interpolation SC block is $N_D$, the number of the static sequence symbols included in the pre-interpolation SC block is M, and the number of the data symbols or multiplexed symbols is $N_D$-M. The multiplexing unit 5b arranges the $N_D$-M data symbols or the multiplexed symbols at the center of the pre-interpolation SC block. As with the multiplexing unit 5 of the first embodiment, the multiplexing unit 5b halves the M static sequence symbols and arranges the halved static sequence symbols within the pre-interpolation SC block such that M/2 symbols which are a rear half of the static sequence symbols are arranged at the head of the pre-interpolation SC block preceding the $N_D$-M data symbols or the multiplexed symbols arranged at the center of the pre-interpolation SC block, and that M/2 symbols which are a front half of the static sequence symbols are arranged at the tail of the pre-interpolation SC block following the $N_D$-M data symbols or the multiplexed symbols. The rear M/2 symbols of the static sequence symbols are the rear half of the static sequence symbols, and the front M/2 symbols of the static sequence symbols are the front half of the static sequence symbols. Note that, as with the multiplexing unit 5 of the first embodiment, the numbers of the static sequence symbols arranged in the pre-interpolation SC block may be different between the front half and the rear half. FIG. 28 is a flowchart illustrating the operation of the multiplexing unit 5b of the transmitting apparatus 10b according to the second embodiment. The multiplexing unit 5b receives the input of the static sequence symbols from the static sequence generation unit 4 (step S141), and receives the input of the data symbols or the multiplexed symbols from the output control section 3b (step S142). The multiplexing unit 5b divides the static sequence symbols (step S143), arranges the data symbols or the multiplexed symbols at the center of the pre-interpolation SC block, and arranges the divided static sequence symbols such that the M/2 symbols which are the rear half of the static sequence symbols are arranged at the head of the pre-interpolation SC block and the M/2 symbols which are the front half of the static sequence symbols are arranged at the tail of the pre-interpolation SC block (step S144).

Figure 29:
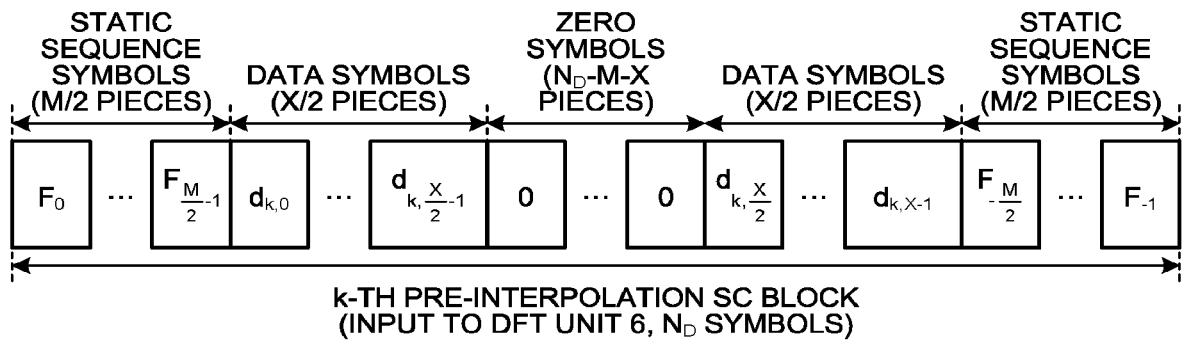
FIG. 29 is a diagram illustrating an example of the configuration of a pre-interpolation SC block including data symbols and zero symbols, the pre-interpolation SC block being output from the multiplexing unit to a DFT unit of the transmitting apparatus according to the second embodiment.

The configuration of the pre-interpolation SC block output from the multiplexing unit 5b to the DFT unit 6 will now be described. FIG. 29 is a diagram illustrating an example of the configuration of the pre-interpolation SC block including the data symbols and the zero symbols, the pre-interpolation SC block being output from the multiplexing unit 5b to the DFT unit 6 of the transmitting apparatus 10b according to the second embodiment. FIG. 29 illustrates, as an example, the kth pre-interpolation SC block output from the multiplexing unit 5b to the DFT unit 6. The data symbols generated by the data generation unit 21 and the zero symbols generated by the zero generation unit 22 are multiplexed by the multiplexing unit 23 to thereby provide the multiplexed symbols, and this multiplexed symbols and the static sequence symbols generated by the static sequence generation unit 4 are multiplexed by the multiplexing unit 5b to thereby provide the kth pre-interpolation SC block. Note that as with the first embodiment, $d_{k,m}$ denotes an mth data symbol in the kth pre-interpolation SC block. The kth pre-interpolation SC block includes $N_D$ symbols that are $F_0, \ldots F_{M/2-1}, d_{k,0}, \ldots d_{k,X/2-1}, N_D\text{-}M\text{-}X$ zeros, $d_{k,X/2}, \ldots d_{k,X-1}, F_{-M/2}, \ldots, F_{-1}$ in order from the head of the pre-interpolation SC block. As illustrated in FIG. 29, in the pre-interpolation SC block, the X/2 symbols which are the front half of the data symbols are arranged at the head side of the block and adjacent to the $N_D$-M-K zero symbols arranged at the center of the pre-interpolation SC block. Also, the X/2 symbols which are the rear half of the data symbols are arranged at the tail side of the block and adjacent to the $N_D$-M-K zero symbols. Moreover, the M/2 symbols which are the rear half of the static sequence symbols are arranged at the head of the pre-interpolation SC block, and the M/2 symbols which are the front half of the static sequence symbols are arranged at the tail of the pre-interpolation SC block. The arrangement of the static sequence symbols within the pre-interpolation SC block is similar to that of the first embodiment. This allows phases to be continuous between SC blocks, which have been subjected to the DFT processing by the DFT unit 6, the interpolation by the interpolation unit 7, and the IDFT processing by the IDFT unit 8, thereby suppressing an out-of-band spectrum.

Note that FIG. 29 illustrates the configuration of the pre-interpolation SC block output from the multiplexing unit 5b to the DFT unit 6 when the output control section 3b outputs, to the multiplexing unit 5b, the multiplexed symbols input from the multiplexing unit 23. When the output control section 3b outputs the data symbols input from the data generation unit 1 to the multiplexing unit 5b, the configuration of the pre-interpolation SC block output from the multiplexing unit 5b to the DFT unit 6 is similar to the configuration of the pre-interpolation SC block in FIG. 11 described in the first embodiment.

The multiplexed symbols having the data symbols and the zero symbols multiplexed, which is output from the multiplexing unit 23, have the configuration of the pre-interpolation SC block illustrated in FIG. 29 with the static sequence symbols removed.

The frequency of transmitting the SC block including the zero symbols, the data symbols, and the static sequence symbols, namely the SC block including the multiplexed symbols and the static sequence symbols, with respect to the SC block including the data symbols and the static sequence symbols is determined on the basis of the content of the control information that is output from the control unit 31*b* of the output control section 3*b*. To transmit the SC block including the multiplexed symbols and static sequence symbols once after transmitting the SC block including the data symbols and the static sequence symbols a predetermined number of times, for example, the control unit 31*b* generates and outputs, to the output unit 32*b*, the control information indicating that the multiplexed symbols for one pre-interpolation SC block should be output from the multiplexing unit 23 after the outputs of the data symbols for a predetermined number of the pre-interpolation SC blocks from the data generation unit 1.

Note that, as with the first embodiment, the length or the number of symbols of the pre-interpolation SC block including the zero symbols is not limited to $N_D$ symbols but may be more than or less than $N_D$ symbols.

Figure 30:
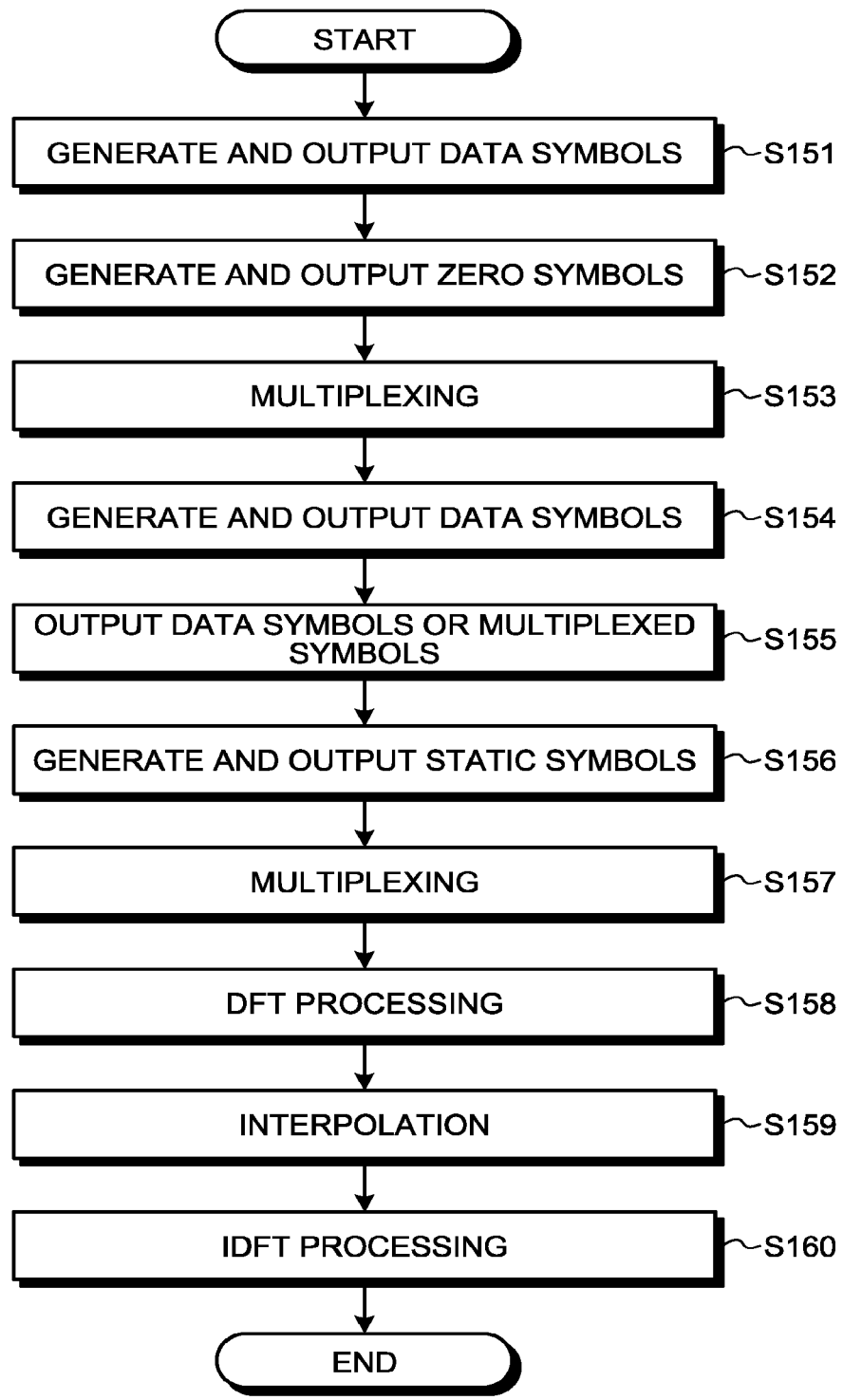
FIG. 30 is a flowchart illustrating the operation of the transmitting apparatus of the second embodiment for generating and outputting an SC block.

Basic processing performed by the transmitting apparatus 10*b* will be described in a flowchart. FIG. 30 is a flowchart illustrating the operation of the transmitting apparatus 10*b* of the second embodiment for generating and outputting the SC block. In the transmitting apparatus 10*b*, first, the data generation unit 21 generates and outputs the data symbols (step S151), the zero generation unit 22 generates and outputs the zero symbols (step S152), and the multiplexing unit 23 multiplexes the data symbols input from the data generation unit 21 and the zero symbols input from the zero generation unit 22 (step S153). The data generation unit 1 generates and outputs the data symbols (step S154). The output control section 3*b* outputs, to the multiplexing unit 5*b*, the data symbols input from the data generation unit 1 or the multiplexed symbols input from the multiplexing unit 23 (step S155). The static sequence generation unit 4 generates and outputs the static sequence symbols (step S156). The multiplexing unit 5*b* multiplexes the data symbols or the multiplexed symbols input from the output control section 3*b* and the static sequence symbols input from the static sequence generation unit 4 (step S157). In the transmitting apparatus 10*b*, then, the DFT unit 6 performs the DFT processing in which the pre-interpolation SC block generated by the multiplexing is converted into the signal in the frequency domain (step S158), the interpolation unit 7 performs the interpolation on the signal in the frequency domain (step S159), and the IDFT unit 8 performs the IDFT processing in which the signal having been subjected to the interpolation is converted into the signal in the time domain (step S160). Note that a detailed operation of each configuration is performed on the basis of a flowchart of each configuration.

Note that the transmitting apparatus 10*b* illustrated in FIG. 25 is configured to include the two data generation units 1 and 21 but may be configured differently. For example, the transmitting apparatus 10*b* may be configured to include a buffer that accumulates the data symbols generated by one data generation unit and output, from the buffer, X pieces of the data symbols to the multiplexing unit 23 or $N_D$ pieces of the data symbols to the output control section 3*b*.

The hardware configuration of the transmitting apparatus 10*b* is similar to the configurations of the transmitting apparatuses 10 and 10*a* of the first embodiment. For example, the data generation unit 21 is configured similarly to the data generation unit 1, the zero generation unit 22 is configured similarly to the zero generation unit 2, the multiplexing units 23 and 5*b* are configured similarly to the multiplexing unit 5, and the output control section 3*b* is configured similarly to the output control section 3.

As has been described, to generate the SC block including the data symbols and the SC block including the data symbols and zero symbols, the transmitting apparatus 10*b* of the present embodiment inserts the static sequence symbols at the same positions in the pre-interpolation SC block including the data symbols and the pre-interpolation SC block including the data symbols and zero symbols before the pre-interpolation SC blocks are subjected to the DFT processing, the interpolation, and the IDFT processing. This removes the phase discontinuity between the SC blocks even in the case of setting the zero section in the signal to is to be transmitted, and can thus suppress the increase in the out-of-band spectrum. Moreover, since the data symbols are included in the SC block including the zero symbols, the data symbols can be transmitted efficiently, as compared to the first embodiment.

The configuration illustrated in the aforementioned embodiments merely illustrates an example of the content of the preset invention, and can thus be combined with another known technique or partially omitted and/or modified without departing from the gist of the present invention.

REFERENCE SIGNS LIST

1, 21 data generation unit, 2, 22 zero generation unit, 3, 3*b*, 12 output control section, 4 static sequence generation unit, 5, 5*b*, 23 multiplexing unit, 6 DFT unit, 7 interpolation unit, 8 IDFT unit, 9 signal conversion section, 10, 10*a*, 10*b* transmitting apparatus, 11 storage unit, 31, 31*b*, 121 control unit, 32, 32*b*, 122 output unit.

The invention claimed is:

1. A transmitting apparatus comprising processing circuitry configured to:
    generate data symbols in time domain that are to be arranged in a. single carrier block transmitted by a beam emitted in a specific direction;
    generate zero symbols in time domain having signal values of zero;
    receive input of the data symbols and the zero symbols, and output either the data symbols or the zero symbols by the single carrier block on a basis of a timing at which a direction of emission of the beam is switched;
    generate static sequence symbols having signal values of a static sequence;
    divide the static sequence symbols and generate a pre-interpolation block by arranging respective ones of the divided static sequence symbols at a head of the outputted symbols by the single carrier block and a tail of the outputted symbols by the single carrier block; and
    perform a Fourier transform, the interpolation, and an inverse Fourier transform on the pre-interpolation block and output the single carrier block.

2. The transmitting apparatus according to claim 1, wherein
    the processing circuitry arranges the divided static sequence symbols to be equal in number at the head and the tail.

3. The transmitting apparatus according to claim 1, wherein
the processing circuitry arranges the divided static sequence symbols to be different in number the head and the tail.

4. The transmitting apparatus according to claim 1 wherein
the processing circuitry arranges a rear half of the divided static sequence symbols at the head of the pre-interpolation block, and arranges a front half of the divided static sequence symbols at the tail of the pre-interpolation block.

5. A control circuitry for a transmitting apparatus, the control circuitry configured to:
generate data symbols in time domain that are to be arranged in a single carrier block transmitted by a beam emitted in a specific direction;
generate zero symbols in time domain having signal values of zero;
receive input of the data symbols and the zero symbols, and output either the data. symbols or the zero symbols by the single carrier block on a basis of a timing at which a direction of emission of the beam is switched;
generate static sequence symbols having signal values of a static sequence;
divide the static sequence symbols and generate a pre-interpolation block by arranging respective ones of the divided static sequence symbols at a head of the outputted symbols by the single carrier block and a tail of the outputted symbols by the single carrier block; and
perform a Fourier transform, the interpolation, and an inverse Fourier transform on the pre-interpolation block and output the single carrier block.

6. A non-transitory computer readable medium that stores instructions for a transmitting apparatus which, when executed by a processor, cause the processor to perform:
generating data symbols in time domain that are to be arranged in a single carrier block transmitted by a beam emitted in a specific direction;
generating zero symbols in time domain having signal values of zero;
receiving input of the data symbols and the zero symbols, and outputting either the data symbols or the zero symbols by the single carrier block on a basis of a timing at which a direction of emission of the beam is switched;
generating static sequence symbols having signal values of a static sequence;
dividing the static sequence symbols and generating a pre-interpolation block by arranging respective ones of the divided static sequence symbols at a head of the outputted symbols by the single carrier block and a tail of the outputted symbols by the single carrier block; and
performing a Fourier transform, the interpolation, and an inverse Fourier transform on the pre-interpolation block and outputting the single carrier block.

* * * * *